(12) United States Patent
Ishii

(10) Patent No.: US 7,728,879 B2
(45) Date of Patent: Jun. 1, 2010

(54) IMAGE PROCESSOR AND VISUAL FIELD SUPPORT DEVICE

(75) Inventor: Yohei Ishii, Osaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 373 days.

(21) Appl. No.: 11/842,685

(22) Filed: Aug. 21, 2007

(65) Prior Publication Data

US 2008/0043113 A1 Feb. 21, 2008

(30) Foreign Application Priority Data

Aug. 21, 2006 (JP) .............................. 2006-224002
Aug. 21, 2006 (JP) .............................. 2006-224429

(51) Int. Cl.
*H04N 5/228* (2006.01)
(52) U.S. Cl. ................ 348/222.1; 348/148; 348/208.14
(58) Field of Classification Search ................ 348/148, 348/169, 208.14, 333.01, 218.1, 222.1
See application file for complete search history.

(56) References Cited

U.S. PATENT DOCUMENTS 6,593,960 B1 * 7/2003 Sugimoto et al. ........... 348/148
7,139,412 B2 * 11/2006 Kato et al. ................... 382/104
7,266,219 B2 9/2007 Okamoto et al.
7,307,655 B1 * 12/2007 Okamoto et al. ......... 348/222.1
2002/0047901 A1 * 4/2002 Nobori et al. ............... 348/149

FOREIGN PATENT DOCUMENTS

| JP | 2002-125224 | 4/2002 |
| JP | 2004-235986 | 8/2004 |
| JP | 2007-027948 A | 2/2007 |

* cited by examiner

*Primary Examiner*—Gevell Selby
(74) *Attorney, Agent, or Firm*—Ditthavong, Mori & Steiner, P.C.

(57) ABSTRACT

Photographed images from a front camera and a side camera respectively installed at the front and left side of a vehicle are respectively converted into bird's-eye view images, and a synthetic bird's-eye view image is displayed which is obtained by synthesizing the bird's-eye view images. Based on a difference image between the front and side cameras, a difference region where a solid object is drawn is detected from a common region where the both bird's-eye view images overlap. Then, based on position of each pixel forming the difference region, it is evaluated which of the front and side cameras captures the solid object better, and an image of the common region in the synthetic bird's-eye view image is formed based on the image obtained from one of the cameras.

10 Claims, 16 Drawing Sheets

DIFFERENCE IMAGE

FIG.13
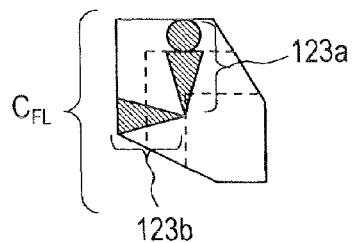
FIG.14
|  | THE NUMBER OF PIXELS BELONGING TO AR1 | THE NUMBER OF PIXELS BELONGING TO AR2 | THE NUMBER OF PIXELS BELONGING TO AR3 |
|---|---|---|---|
|  | 15 | 18 | 2 |
|  | 12 | 5 | 0 |
FIG.15
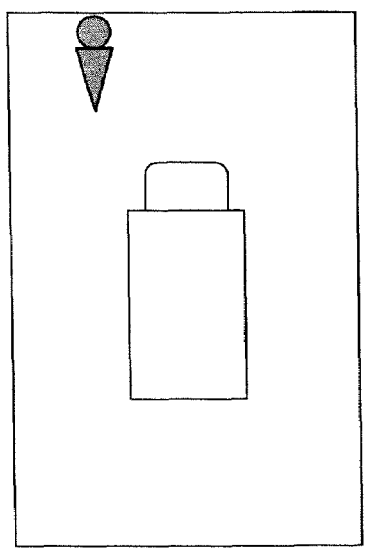

DIFFERENCE REGION
FOR THE LEFT SIDE CAMERA IMAGE

DIFFERENCE REGION
FOR THE FRONT CAMERA IMAGE

US 7,728,879 B2

IMAGE PROCESSOR AND VISUAL FIELD SUPPORT DEVICE

This nonprovisional application claims priority under 35 U.S.C. §119(a) on Patent Application No. 2006-224429 filed in Japan on Aug. 21, 2006 and Patent Application No. 2006-224002 filed in Japan on Aug. 21, 2006, the entire contents of which are hereby incorporated by reference.

BACKGROUND OF THE INVENTION

1. Field of the Invention

The present invention relates to a visual field support device and a visual field support method, and particularly relates to technology of generating bird's-eye views from images taken by a plurality of cameras installed at a vehicle and then synthesizing the bird's-eye views. The present invention also relates to an image processor for use in the visual field support device.

2. Description of Related Art

A driver of an automobile or the like, upon running backward, faces difficulty in checking rearview due to the presence of a blind spot. Thus, a system has been already developed which is equipped with an in-car camera for monitoring the rear of a vehicle that is likely to be a blind spot for the driver and which displays a photographed image of the rear on a screen for car navigation or the like.

Moreover, studies have been conducted for, instead of simply displaying a picture with a camera, presenting a more human-friendly picture by use of image processing technology. One of such studies is performing coordinate conversion of a photographed image to thereby generate and display such a bird's-eye view image as is viewed from above the ground. Displaying this bird's-eye view image makes it easier for the driver to recognize condition of the rear of the vehicle.

Furthermore, a visual field support device has been developed which converts images obtained from a plurality of cameras into an all-around bird's-eye view image through geometric conversion and then displays this image on a display section. This visual field support device has an advantage of capable of presenting the driver with condition of all the periphery of the vehicle as a picture viewed from the above, thus covering the surrounding of the vehicle through 360 degrees without any blind spots.

Now, the visual field support device of this type will be described as a conventional example. FIG. 16 is a plan view from above the vehicle 100, showing installation condition of cameras at the vehicle 100. FIG. 17 is a view from the diagonally left front of the vehicle 100. FIG. 17 schematically shows visual fields (photographing regions) of the respective cameras. The vehicle 100 is a truck composed of a driver's cabin and a luggage compartment having a height larger than that of the driver's cabin.

As shown in FIG. 16, the vehicle 100 has cameras (photographing apparatuses) 1F, 1B, 1L, and 1R respectively fitted at the front, rear, left, and right thereof. The cameras 1F, 1B, 1L, and 1R correspond to a front camera, a rear camera, a left side camera, and a right side camera, respectively.

The visual field support device generates bird's-eye view images from images taken by the respective cameras and then synthesizes these bird's-eye view images to thereby display on a display device an all-around bird's-eye view image as shown in FIG. 18. On the display screen of the display device, the vehicle is displayed at the center and the bird's-eye view images respectively obtained from the cameras 1F, 1B, 1L, and 1R are displayed at the front, rear, left and right, respectively, of this vehicle.

There is a portion where visual fields (photographing regions) of the different cameras overlap each other, as shown in FIG. 17. For example, at a given region located diagonally left front of the vehicle 100, the visual fields of the cameras 1F and 1L overlap each other. This overlapping portion corresponds to a region numbered with numeral 101 of FIG. 18. Typically displayed on the region 101 is a picture based on the image photographed by the camera 1F or the image photographed by the camera 1L, or a picture obtained by averaging these images.

The visual field support device of this type performs synthesis processing so that an image has continuity on the ground surface, and thus displays parking slot lines, signs, letters, and the like drawn on the ground surface without any problems. This also applies to the region 101 of FIG. 18. However, a solid object placed on the ground surface is viewed differently at different viewpoints of the camera, thus making it difficult, in principle, to accurately and continuously draw this object in an all-round bird's-eye view image.

For example, consider a case where a person as a solid object 102 is present in a portion (space) where the visual field of the camera 1F and the visual field of the camera 1L overlap each other, as shown in FIG. 19. In this case, when a bird's-eye view image is generated from an image photographed by the camera 1F, the solid object 102 on this bird's-eye view image appears as an image tilted leftward, as shown in FIG. 20. On the other hand, when a bird's-eye view image is generated from an image photographed by the camera 1L, the solid object 102 on this bird's-eye view image appears as an image tilted forward, as shown in FIG. 21.

To synthesize the bird's-eye view image obtained from the camera 1F and the bird's-eye view image obtained from the camera 1L, defining a synthesis boundary 103 as shown in FIGS. 20 and 21 and then simply attaching together the both bird's-eye view images at the synthesis boundary 103 causes a problem that the solid object 102 disappears in an all-round bird's-eye view image obtained through this synthesis.

A possible technique for solving such a problem is generating an image of a common region, where the bird's-eye view image obtained from the camera 1F and the bird's-eye view image obtained from the camera 1L overlap each other, by way of averaging the both bird's-eye view images. However, adopting such an averaging technique results in a solid object appearing as a double image in the all-round bird's-eye view image. Moreover, each image included in the double image is averaged with a background image, which makes it very hard to see the solid object depending on the colors of the solid object and the background.

A method as provided below is a conventional method for separately generating an all-round bird's-eye view image adopting only a bird's-eye view image obtained from the cameral 1F as an image of a common region and an all-round bird's-eye view image adopting only a bird's-eye view image obtained from the cameral 1L as an image of a common region and then displaying these two types of all-around bird's-eye view images on the right and left. A display image in this case appears as a display image 200 of FIG. 22. With this method, however, a plurality of images to be checked by the driver are displayed simultaneously, thus adversely causing confusion, which possibly compromises the security.

There is also a possible method for switching, through, manual or machine operation between adopting an image of a bird's-eye view obtained from the camera 1F as an image of a common region and adopting an image of a bird's-eye view obtained from the camera 1L as an image of a common region. In this case, a display image 201 and a display image 202 shown in FIG. 23 are switched for display. However, switching by the manual operation is complicated, and a picture generated only based on the machine operation is not necessarily a picture in which a solid object can be easily recognized. Further, the switching based on manual or machine operation is equivalent to moving the synthesis boundary to the end of the common region, thus leaving possibility that a display of the solid object around the boundary disappears. That is, it is difficult to avoid, by simple switching, the problem that the solid object disappears.

SUMMARY OF THE INVENTION

A first image processor according to the present invention includes: a visual point conversion section respectively converting images photographed by an n-number of photographing apparatuses (where n is an integer of 2 or larger) into bird's-eye view images as viewed from a virtual visual point; and an image synthesis section synthesizing the obtained bird's-eye view images to generate a synthetic bird's-eye view image, and generates a video signal for displaying the synthetic bird's-eye view image on a display device. In the image processor, the image synthesis section compares, between a plurality of the bird's-eye view images, images of a common region where the plurality of the bird's-eye view images overlap upon the synthesis to thereby specify a difference region between the plurality of the bird's-eye view images in the common region, selects, in accordance with position of the difference region in the common region, one bird's-eye view image from among the plurality of the bird's-eye view images as an image to be adopted, and adopts, as an image of the common region in the synthetic bird's-eye view image, the image of the common region in the image to be adopted.

Specifically, for example, weight values corresponding to respective pixel positions of the image in the common region may be set for each of the plurality of the bird's-eye view images, part or all of the set weight values may differ between the plurality of the bird's-eye view images, the image synthesis section may sum up the weight values corresponding to pixels included in the difference region to thereby calculate a summed value for each of the plurality of the bird's-eye view images, and may select, based on the summed values, the image to be adopted.

More specifically, for example, the image synthesis section may compare the summed values between the plurality of the bird's-eye view images to thereby select the image to be adopted.

More specifically, for example, the n-number of photographing apparatuses may be installed at a vehicle and may photograph surrounding of the vehicle, and the image synthesis section, based on driving condition of the vehicle in addition to the summed values, may select the image to be adopted.

For example, the weight values may be set based on installation positions of a plurality of the photographing apparatuses corresponding to the plurality of the bird's-eye view images.

A visual field support device may be formed by including the image processor described above, and at least one of the n-number of photographing apparatuses and the display device.

A first visual support method according to the invention for respectively converting images photographed by an n-number of photographing apparatuses (where n is an integer of 2 or larger) into bird's-eye view images as viewed from a virtual visual point and displaying on a display device a synthetic bird's-eye view image obtained by synthesizing the obtained bird's-eye view images: compares, between a plurality of the bird's-eye view images, images of a common region where the plurality of the bird's-eye view images overlap upon the synthesis to thereby specify a difference region between the plurality of the bird's-eye view images in the common region; selects, in accordance with position of the difference region in the common region, one bird's-eye view image from among the plurality of the bird's-eye view images as an image to be adopted; and adopts, as an image of the common region in the synthetic bird's-eye view image, the image of the common region in the image to be adopted.

A second image processor according to the invention includes: a visual point conversion section respectively converting images photographed by an n-number of photographing apparatuses (where n is an integer of 2 or larger) into bird's-eye view images as viewed from a virtual visual point; and an image synthesis section synthesizing the obtained bird's-eye view images to generate a synthetic bird's-eye view image, and generates a video signal for displaying the synthetic bird's-eye view image on a display device. In the image processor, the image synthesis section, when a solid object having some height is present in a common visual field photographed in common by a plurality of the photographing apparatuses, detects a solid object reflecting region corresponding to a synthetic region of regions where the solid object is drawn in a plurality of the bird's-eye view images obtained from the plurality of the photographing apparatuses, and adopts, as an image of the solid object reflecting region in the synthetic bird's-eye view image, an image of the solid object reflecting region in one of the plurality of the bird's-eye view images.

Specifically, for example, the image synthesis section may compare, between the plurality of the bird's-eye view images, images of a common region where the plurality of the bird's-eye view images overlap upon the synthesis to thereby detect the solid object reflecting region.

More specifically, for example, the image synthesis section may compare, between the plurality of the bird's-eye view images, images of a common region where the plurality of the bird's-eye view images overlap upon the synthesis to thereby specify a difference region between the plurality of the bird's-eye view images in the common region, and may detect the difference region as the solid object reflecting region.

A visual field support device may be formed by including: the image processor described above; and at least one of the n-number of photographing apparatuses and the display device.

A second visual support method according to the invention for respectively converting images photographed by an n-number of photographing apparatuses (where n is an integer of 2 or larger) into bird's-eye view images as viewed from a virtual visual point and displaying on a display device a synthetic bird's-eye view image obtained by synthesizing the obtained bird's-eye view images, when a solid object having some height is present in a common visual field photographed in common by a plurality of the photographing apparatuses, detects a solid object reflecting region corresponding to a synthetic region of regions where the solid object is drawn in a plurality of the bird's-eye view images obtained from the plurality of the photographing apparatuses, and adopts, as an image of the solid object reflecting region in the synthetic bird's-eye view image, an image of the solid object reflecting region in one of the plurality of the bird's-eye view images.

BRIEF DESCRIPTION OF THE DRAWINGS

FIG. 13 is a diagram for explaining the processing of step S4 of FIG. 9;

FIG. 14 is a diagram for explaining the processing of step S4 of FIG. 9, illustrating the number of pixels belonging to the respective regions of FIG. 11;

FIG. 15 is a diagram showing an example of an all-round bird's-eye view image generated by an image processing section of FIG. 8 according to Example 1 of the invention;

DETAILED DESCRIPTION OF PREFERRED EMBODIMENTS

Hereinafter, the embodiments of the present invention will be described in detail with reference to the accompanying drawings. In the figures referenced, the same portions are numbered with the same numerals and thus overlapping explanation for the same portions will be basically omitted. Examples 1 to 3 will be described later, and items common between these Examples or items referenced in these Examples will be described first.

[Method for Generating a Bird's-Eye View Image]

First, the method for generating a bird's-eye view image from a photographed image taken by one camera will be described. The description below is based on the assumption that the ground is located on the horizontal plane and that "height" represents height with respect to the ground.

Figure 1:
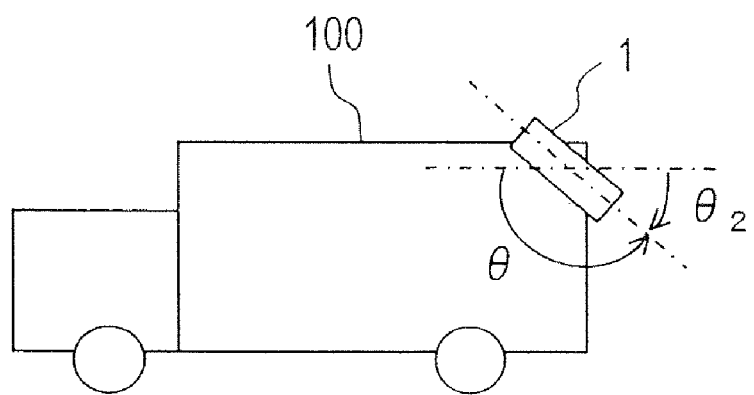
FIG. 1 is a plan view of a vehicle equipped with one camera as viewed from the side, explaining a method for generating a bird's-eye view image from an image photographed by this camera.

As shown in FIG. 1, consider a case where a camera 1 is installed at the back of a vehicle 100 diagonally downward thereof. The vehicle 100 is, for example, a truck. The angle formed by the horizontal plane and the optical axis of the camera 1 includes two types of angles expressed by $\theta$ and $\theta_2$, respectively, shown in FIG. 1. The angle $\theta_2$ is typically called a look-down angle or an angle of depression. Now, on the assumption that the angle $\theta$ is a tilt angle of the camera 1 with respect to the horizontal plane, $90°<\theta<180°$ holds.

Figure 2:
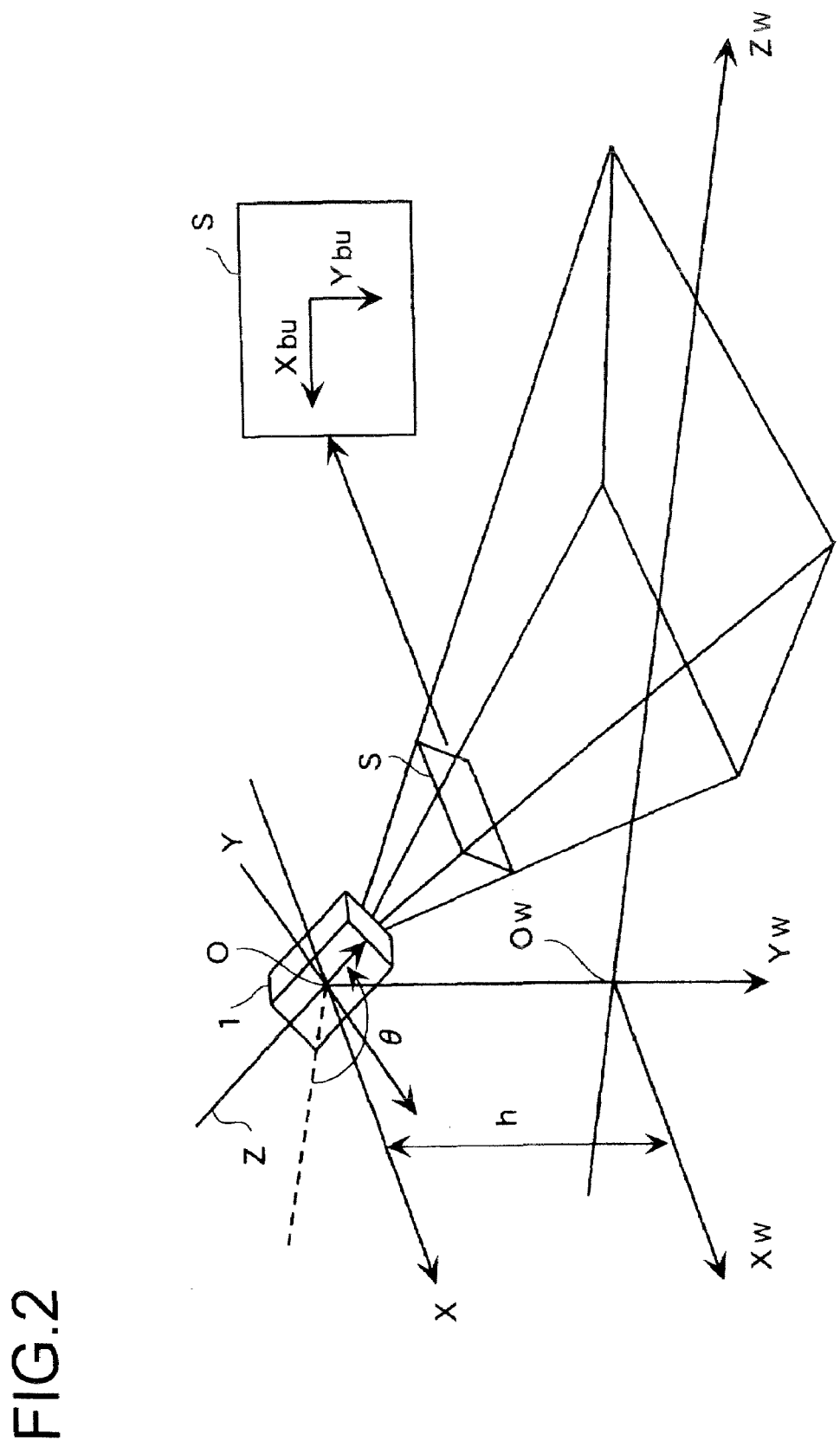
FIG. 2 is a diagram showing relationship between a camera coordinate system XYZ, a coordinate system $X_{bu}Y_{bu}$ of a camera image-sensing surface and a worldwide coordinate system $X_w Y_w Z_w$ including a two-dimensional ground coordinate system $X_w Y_w$.

FIG. 2 shows relationship between a camera coordinate system XYZ, a coordinate system $X_{bu}Y_{bu}$ of an image-sensing surface S of the camera 1, and a worldwide coordinate system $X_w Y_w Z_w$ including a two-dimensional ground coordinate system $X_w Y_w$. The camera coordinate system XYZ is a three-dimensional coordinate system with X, Y, and Z axes provided as coordinates axes. The coordinate system $X_{bu}Y_{bu}$ is a two-dimensional coordinate system with $X_{bu}$ and $Y_{bu}$ axes provided as coordinate axes. The two-dimensional ground coordinate system $X_w Y_w$ is a two-dimensional coordinate system with $X_w$ and $Y_w$ axes provided as coordinates axes. The worldwide coordinate system $X_w Y_w Z_w$ is a three-dimensional coordinate system with $X_w$, $Y_w$, and $Z_w$ axes provided as coordinate axes.

In the camera coordinate system XYZ, with the optical center of the camera 1 provided as an origin O, the Z-axis is provided along the optical axis, the X-axis is provided in a direction orthogonal to the Z-axis and parallel to the ground, and the Y-axis is provided in a direction orthogonal to the Z- and X-axes. In the coordinate system $X_{bu}Y_{bu}$ of the image-sensing surface S, the center of the image-sensing surface S is provided as an origin, the $X_{bu}$-axis is provided in the lateral direction of the image-sensing surface S, and the $Y_{bu}$-axis is provided in the longitudinal direction of the image-sensing surface S.

In the worldwide coordinate system $X_wY_wZ_w$, an intersection between a vertical line passing through the origin O of the camera coordinate system XYZ and the ground is provided as an origin $O_w$, the $Y_w$-axis is provided in a direction perpendicular to the ground, the $X_w$-axis is provided in a direction parallel to the X-axis of the camera coordinate system XYZ, and the $Z_w$-axis is provided in a direction orthogonal to the $X_w$- and $Y_w$-axes.

The amount of parallel movement between the $X_w$- and X-axes is "h" and the direction of this parallel movement is vertical to the ground. An obtuse angle formed by the $Z_w$- and $X_w$-axes agrees with the tilt angle θ.

Coordinates in the camera coordinate system XYZ are expressed as (x, y, z). Symbols x, y, and z are an X-axis component, a Y-axis component, and a Z-axis component, respectively, in the camera coordinate system XYZ. Coordinates in the worldwide coordinate system $X_wY_wZ_w$ are expressed as $(x_w, y_w, z_w)$. Symbols $x_w$, $y_w$, and $z_w$ are an $X_w$-axis component, an $Y_w$-axis component, and a $Z_w$-axis component, respectively, in the worldwide coordinate system $X_wY_wZ_w$. Coordinates in the two-dimensional ground coordinate system $X_wZ_w$ are expressed as $(x_w, z_w)$. Symbols $x_w$ and $Z_w$ are an $X_w$-axis component and a $Z_w$-axis component, respectively, in the two-dimensional ground coordinate system $X_wZ_w$, and they agree with the $X_w$-axis component and the $Z_w$-axis component in the worldwide coordinate system $X_wY_wZ_w$. Coordinates in the coordinate system $X_{bu}Y_{bu}$ of the image sensing surface S are expressed as $(x_{bu}, y_{bu})$. Symbols $x_{bu}$ and $y_{bu}$ are an $X_{bu}$-axis component and an $Y_{bu}$-axis component, respectively, in the coordinate system $X_{bu}Y_{bu}$ of the image sensing surface S.

Equation for conversion between the coordinates (x, y, z) of the camera coordinate system XYZ and the coordinates $(x_w, y_w, z_w)$ of the worldwide coordinate system $X_wY_wZ_w$ is expressed by equation (1) below:

$$\begin{bmatrix} x \\ y \\ z \end{bmatrix} = \begin{bmatrix} 1 & 0 & 0 \\ 0 & \cos\theta & -\sin\theta \\ 0 & \sin\theta & \cos\theta \end{bmatrix} \left( \begin{bmatrix} x_w \\ y_w \\ z_w \end{bmatrix} + \begin{bmatrix} 0 \\ h \\ 0 \end{bmatrix} \right). \qquad (1)$$

Provided that the focal length of the camera 1 is "f", equation for conversion between the coordinates $(x_{bu}, y_{bu})$ of the coordinate system $X_{bu}Y_{bu}$ of the image sensing surface S and the coordinates (x, y, z) of the camera coordinate system XYZ is expressed by equation (2) below:

$$\begin{bmatrix} x_{bu} \\ y_{bu} \end{bmatrix} = \begin{bmatrix} f\frac{x}{z} \\ f\frac{y}{z} \end{bmatrix}. \qquad (2)$$

Obtained based on the above equations (1) and (2) is an equation (3) below for conversion between the coordinates $(x_{bu}, y_{bu})$ of the coordinate system $X_{bu}Y_{bu}$ of the image sensing surface S and the coordinates $(x_w, z_w)$ of the two-dimensional ground coordinate system $X_wZ_w$:

$$\begin{bmatrix} x_{bu} \\ y_{bu} \end{bmatrix} = \begin{bmatrix} \dfrac{fx_w}{h\sin\theta + z_w\cos\theta} \\ \dfrac{(h\cos\theta - z_w\sin\theta)f}{h\sin\theta + z_w\cos\theta} \end{bmatrix}. \qquad (3)$$

Although not shown in FIG. 2, a bird's-eye view coordinate system $X_{au}Y_{au}$ as a coordinate system for a bird's-eye view image is now defined. The bird's-eye view coordinate system $X_{au}Y_{au}$ is a two-dimensional coordinate system with a $X_{au}$-axis and a $Y_{au}$-axis provided as coordinate axes. The coordinates in the bird's-eye view coordinate system $X_{au}Y_{au}$ are expressed as $(x_{au}, y_{au})$. The bird's-eye view image is expressed by a pixel signal of a plurality of pixels arrayed two-dimensionally. The position of each pixel on the bird's-eye view image is expressed by the coordinates $(x_{au}, y_{au})$. The symbols $x_{au}$ and $y_{au}$ are a $X_{au}$-axis component and a $Y_{au}$-axis component, respectively, in the bird's-eye view coordinate system $X_{au}Y_{au}$.

The bird's-eye view image is obtained by converting an image photographed by an actual camera into an image as viewed from a visual point of a virtual camera (hereinafter referred to as a virtual visual point). More specifically, the bird's-eye view image is obtained by converting an image photographed by the actual camera into an image as the ground surface is looked down vertically. The conversion of the visual point at the time of generating a bird's-eye view image from a photographed image is typically called visual point conversion.

Projection from the two dimensional ground coordinate system $X_wZ_w$ to the bird's-eye view coordinate system $X_{au}Y_{au}$ of the virtual camera is performed through parallel projection. Where the height of the virtual camera (that is, height of the virtual visual point) is H, an equation for conversion between the coordinates $(x_w, z_w)$ of the two dimensional ground coordinate system $X_wZ_w$ and the coordinates $(x_{au}, y_{au})$ of the bird's-eye view coordinate system $X_{au}Y_{au}$ is expressed by equation (4) below. The height H of the virtual camera is previously set. Further, equation (5) below is obtained by modifying the equation (4):

$$\begin{bmatrix} x_{au} \\ y_{au} \end{bmatrix} = \frac{f}{H}\begin{bmatrix} x_w \\ z_w \end{bmatrix} \qquad (4)$$

$$\begin{bmatrix} x_w \\ z_w \end{bmatrix} = \frac{H}{f}\begin{bmatrix} x_{au} \\ y_{au} \end{bmatrix}. \qquad (5)$$

Substituting the equation (5) obtained into the equation (3) provides equation (6) below:

$$\begin{bmatrix} x_{bu} \\ y_{bu} \end{bmatrix} = \begin{bmatrix} \dfrac{fHx_{au}}{fh\sin\theta + Hy_{au}\cos\theta} \\ \dfrac{f(fh\cos\theta - Hy_{au}\sin\theta)}{fh\sin\theta + Hy_{au}\cos\theta} \end{bmatrix}. \qquad (6)$$

From the equation (6), equation (7) below for converting the coordinates $(x_{bu}, y_{bu})$ of the coordinate system $X_{bu}Y_{bu}$ of the image-sensing surface S into the coordinates $(x_{au}, y_{au})$ of the bird's-eye view coordinate system $X_{au}Y_{au}$ is obtained:

$$\begin{bmatrix} x_{au} \\ y_{au} \end{bmatrix} = \begin{bmatrix} \dfrac{x_{bu}(fh\sin\theta + Hy_{au}\cos\theta)}{fH} \\ \dfrac{fh(f\cos\theta - y_{bu}\sin\theta)}{H(f\sin\theta + y_{bu}\cos\theta)} \end{bmatrix}. \quad (7)$$

The coordinates ($x_{bu}$, $y_{bu}$) of the coordinate system $X_{bu}Y_{bu}$ of the image-sensing surface S express the coordinates on the image photographed by the camera 1. Thus, the image photographed by the camera 1 is converted into a bird's-eye view image by employing the equation (7). In practice, image processing such as lens distortion correction or the like is performed as appropriate on the image photographed by the camera 1 and then the photographed image already subjected to the image processing is converted into the bird's-eye view image by employing the equation (7).

[Basic Idea of a Method for Generating an All-Round Bird's-Eye View Image]

Figure 3:
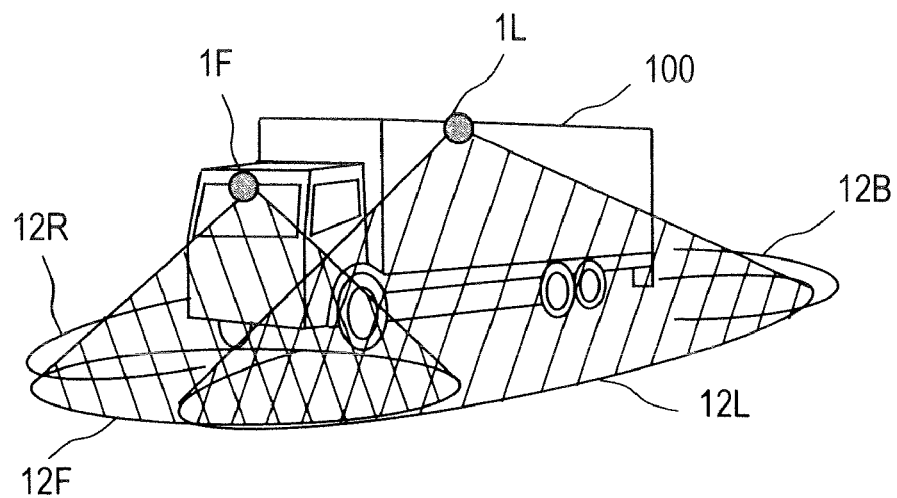
FIG. 3 is a diagram of the vehicle according to embodiments of the present invention as viewed from diagonally front left thereof.
Figure 4:
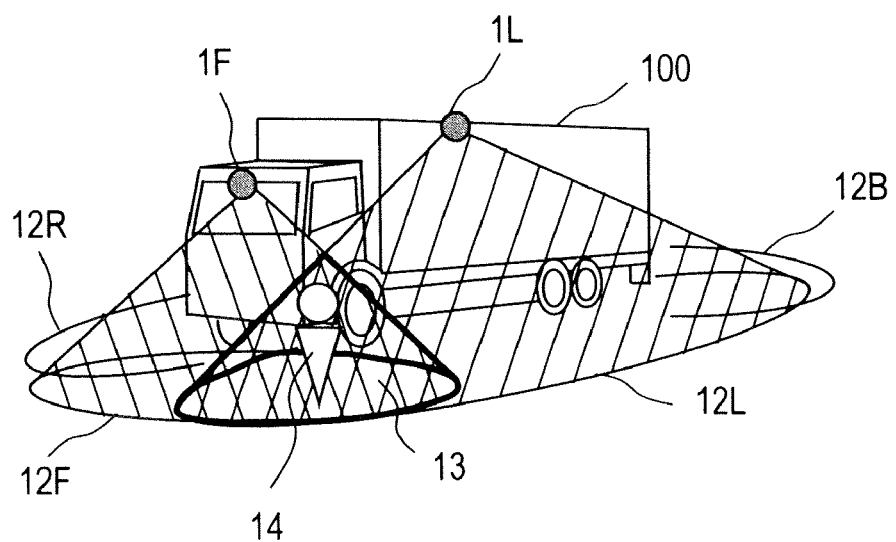
FIG. 4 is a diagram of the vehicle according to the embodiments of the present invention as viewed from diagonally front left thereof.
Figure 16:
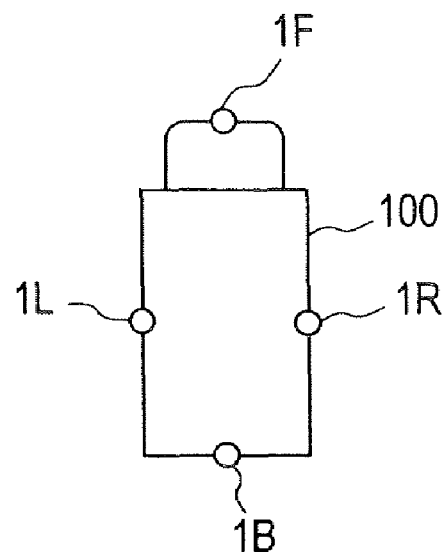
FIG. 16 is a plan view showing a condition that a plurality of cameras are installed at the vehicle.
Figure 17:
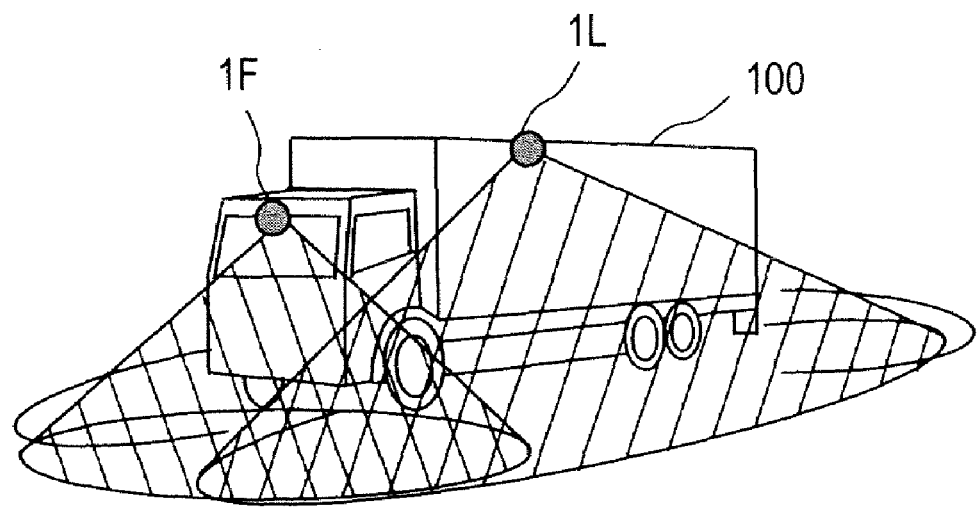
FIG. 17 is a diagram of the vehicle of FIG. 16 as viewed from diagonally front left according to a conventional method.

In this embodiment, a plan view showing a condition that the camera is installed at the vehicle 100 is the same as FIG. 16 described above, and thus overlapping illustration will be omitted. FIGS. 3 and 4 are diagrams of the vehicle 100 as viewed diagonally from front left.

As shown in FIG. 16, cameras (photographing apparatuses) 1F, 1B, 1L, and 1R are respectively fitted at the front, rear, left side, and right side of the vehicle 100. In the description below, the cameras 1F, 1B, 1L, and 1R may be called a front camera 1F, a rear camera 1B, a left side camera 1L, and a right side camera 1R, respectively.

Moreover, as shown in FIGS. 3 and 4, the camera 1F is installed, for example, at the upper part of the front mirror of the vehicle 100. The camera 1L is installed, for example, at the uppermost part of the left side surface of the vehicle 100. Although not shown in FIGS. 3 and 4, the camera 1B is installed, for example, at the rear uppermost part of the vehicle 100, and the camera 1R is installed, for example, at the uppermost part of the right side surface of the vehicle 100.

The camera 1F, the camera 1B, the camera 1L, and the camera 1R are installed at the vehicle 100 so that the optical axis of the camera 1F is directed diagonally downward to the front of the vehicle 100, so that the optical axis of the camera 1B is directed diagonally downward to the rear of the vehicle 100, so that the optical axis of the camera 1L is directed diagonally downward to the left of the vehicle 100, and so that the optical axis of the camera 1R is directed diagonally downward to the right of the vehicle 100.

The heights of installation positions of the cameras 1L and 1R are higher than the height of the installation position of the camera 1F. The vehicle 100 is located on the ground.

FIGS. 3 and 4 show visual fields, that is, regions photographed by the respective cameras. Each of the cameras generates a photographed image of a subject taken within its own visual field. The visual fields of the cameras 1F, 1B, 1L, and 1R are expressed by 12F, 12B, 12L, and 12R, respectively. The visual fields 12R and 12B are only partially shown in FIGS. 3 and 4.

The visual field 12F of the camera 1F includes a solid object located in a given range in front of the vehicle 100 and the ground in front of the vehicle 100, with reference to the installation position of the camera 1F. The visual field 12B of the camera 1B includes a solid object located in a given range behind the vehicle 100 and the ground behind the vehicle 100, with reference to the installation position of the camera 1B. The visual field 12L of the camera 1L includes a solid object located in a given range to the left of the vehicle 100 and the ground to the left of the vehicle 100, with reference to the installation position of the camera 1L. The visual field 12R of the camera 1R includes a solid object located in a given range to the right of the vehicle 100 and the ground to the right of the vehicle 100, with reference to the installation position of the camera 1R.

As described above, the different cameras have different visual points and thus different subjects fit within the visual fields (angles of views) of the respective cameras. The solid object (in other words, three-dimensional object) is an object, such as a person, which has some height. A road surface forming the ground or the like is not a solid object since it has no height.

The cameras 1F and 1L photographs a given region, located diagonally leftward and forward of the vehicle 100, in common with each other. That is, the visual fields 12F and 12L overlap on the given region located diagonally leftward and forward of the vehicle 100. This overlapping portion is called a common visual field (common photographing space).

Similarly, the visual fields 12F and 12R overlap on a given region located diagonally rightward and forward of the vehicle 100, thereby forming their common visual field. The visual fields 12B and 12L overlap on a given region located diagonally leftward and rearward of the vehicle 100, thereby forming their common visual field. The visual fields 12B and 12R overlap on a given region located diagonally rightward and rearward of the vehicle 100, thereby forming their common visual field.

The common visual field between the visual fields 12F and 12L in particular is called a common visual field 13. Hereinafter, description is given focusing on this common visual field 13. The same processing applies to the common visual fields other than the common visual field 13.

FIG. 4 shows the common visual field 13 with a solid line. The common visual field 13 is a space similar to a cone having, as a bottom surface, the ground located diagonally leftward and forward of the vehicle 100. As shown in FIG. 4, a solid object 14 is assumed to be present within the common visual field 13.

Figure 5:
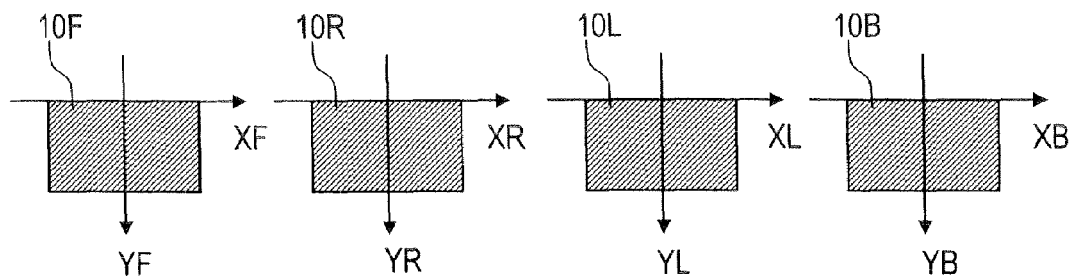
FIG. 5 is a diagram showing different bird's-eye view images according to the embodiments of the invention.

In this embodiment, as shown in FIG. 5, from photographed images obtained from the cameras 1F, 1B, 1L, and 1R, bird's-eye view images 10F, 10B, 10L, and 10R are respectively generated by employing the equation (7). Next, with respect to the bird's-eye view image 10B corresponding to the camera 1B, the other bird's-eye view images 10F, 10L, and 10R are converted into coordinates on the bird's-eye view image 10B by rotating and/or parallely moving them (bird's-eye view images 10F, 10L, and 10R). Consequently, the coordinates of the respective bird's-eye view images are converted into coordinates on an all-round bird's-eye view image. Hereinafter, the coordinates in the all-round bird's-eye view image is called "all-round bird's-eye view coordinates".

Figure 6:
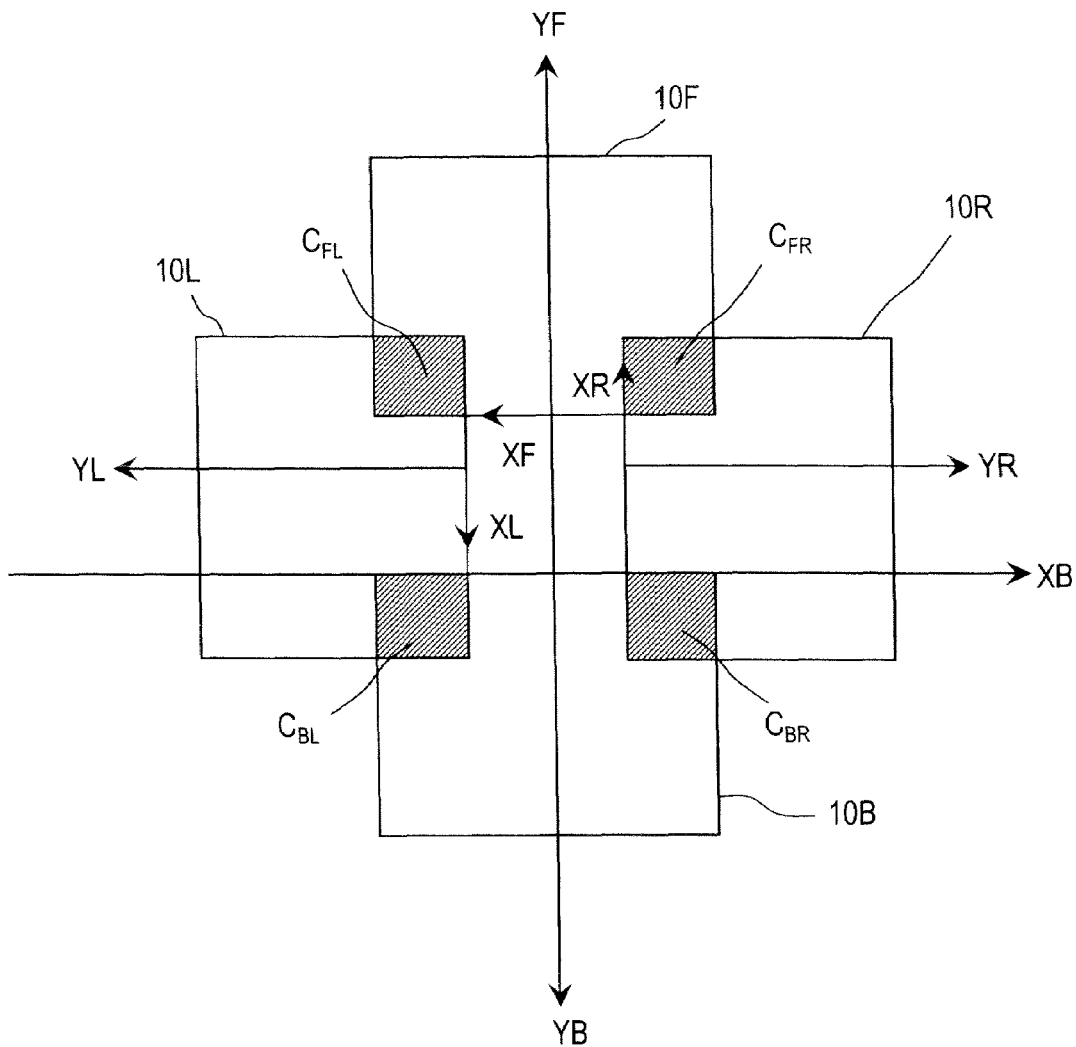
FIG. 6 is a diagram of the bird's-eye view images of FIG. 5 converted onto an all-round bird's-eye view image coordinates.

FIG. 6 shows the bird's-eye view images 10F, 10B, 10L, and 10R shown on the all-round bird's-eye view coordinates. Considering the all-round bird's-eye view coordinates, there exist portions where the two bird's-eye view images overlap, as shown in FIG. 6.

In FIG. 6, a diagonally shaded region provided with $C_{FL}$ is a portion where the bird's-eye view images 10F and 10L overlap on the all-round bird's-eye view coordinates, and is called a common region $C_{FL}$. In the bird's-eye view image 10F, the image of the subject within the common visual field 13 (see FIG. 4) as viewed from the camera 1F appears in the common region $C_{FL}$. In the bird's-eye view image 10L, the image of the subject within the common visual field 13 as viewed from the camera 1L appears in the common region $C_{FL}$. The common region can also be called an overlapping region where a plurality of bird's-eye view images overlap.

In addition to the common region $C_{FL}$, there are a common region $C_{FR}$ where the bird's-eye view images 10F and 10R overlap, a common region $C_{BL}$ where the bird's-eye view images 10B and 10L overlap, and a common region $C_{BR}$ where the bird's-eye view images 10B and 10R overlap. This embodiment will be described, putting special focus on the common region $C_{FL}$ corresponding to the common visual field 13.

In FIGS. 5 and 6, an XF-axis and an YF-axis are coordinate axes of the coordinate system of the bird's-eye view image 10F, and they correspond to a $X_{au}$-axis and a $Y_{au}$-axis. Similarly, an XR-axis and a YR-axis are coordinate axes of the coordinate system of the bird's-eye view image 10R, and they correspond to a $X_{au}$-axis and a $Y_{au}$-axis. Similarly, an XL-axis and an YL-axis are coordinate axes of the coordinate system of the bird's-eye view image 10L, and they correspond to a $X_{au}$-axis and a $Y_{au}$-axis. Similarly, an XB-axis and an YB-axis are coordinate axes of the coordinate system of the bird's-eye view image 10B, and they correspond to a $X_{au}$-axis and a $Y_{au}$-axis.

Figure 7A:
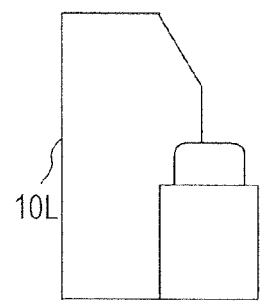
FIG. 7A is a diagram showing a bird's-eye view image generated from an image photographed by a left side camera of FIG. 3.
Figure 7B:
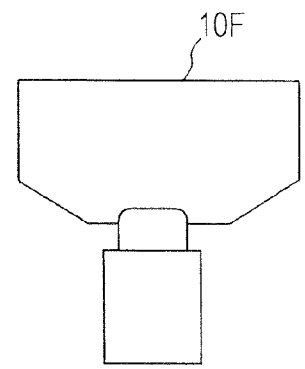
FIG. 7B is a diagram showing a bird's-eye view image generated from an image photographed by a front camera of FIG. 3.
Figure 7C:
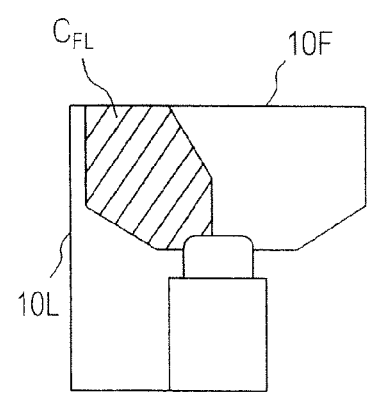
FIG. 7C is a diagram clarifying a common region between the two bird's-eye views images.

In FIG. 6, the common region $C_{FL}$ is rectangular for simplified illustration purposes, but the actual common region $C_{FL}$ is not rectangular. In addition, each of the bird's-eye view images is not necessarily rectangular. FIGS. 7A, 7B, and 7C show in more detail the regions where the respective bird's-eye view images appear and the common region $C_{FL}$. FIGS. 7A and 7B respectively show the bird's-eye view images 10L and 10F on the all-round bird's-eye view coordinates. FIG. 7C shows the common region $C_{FL}$ thereof indicated by a diagonally shaded region. Note that illustration of an image near the rear of the vehicle is omitted in FIGS. 7A and 7C. The characteristic of this embodiment lies in how two bird's-eye view images are synthesized in this common region $C_{FL}$.

[A Detailed Method for Generating an All-Round Bird's-Eye View Image]

Figure 8:
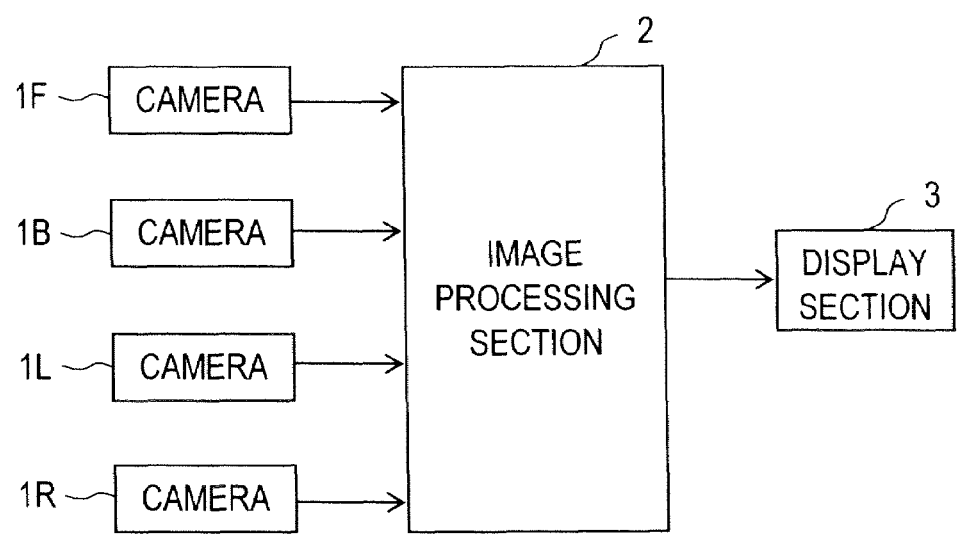
FIG. 8 is an overall configuration diagram of a visual field support device according to the embodiments of the invention.
Figure 18:
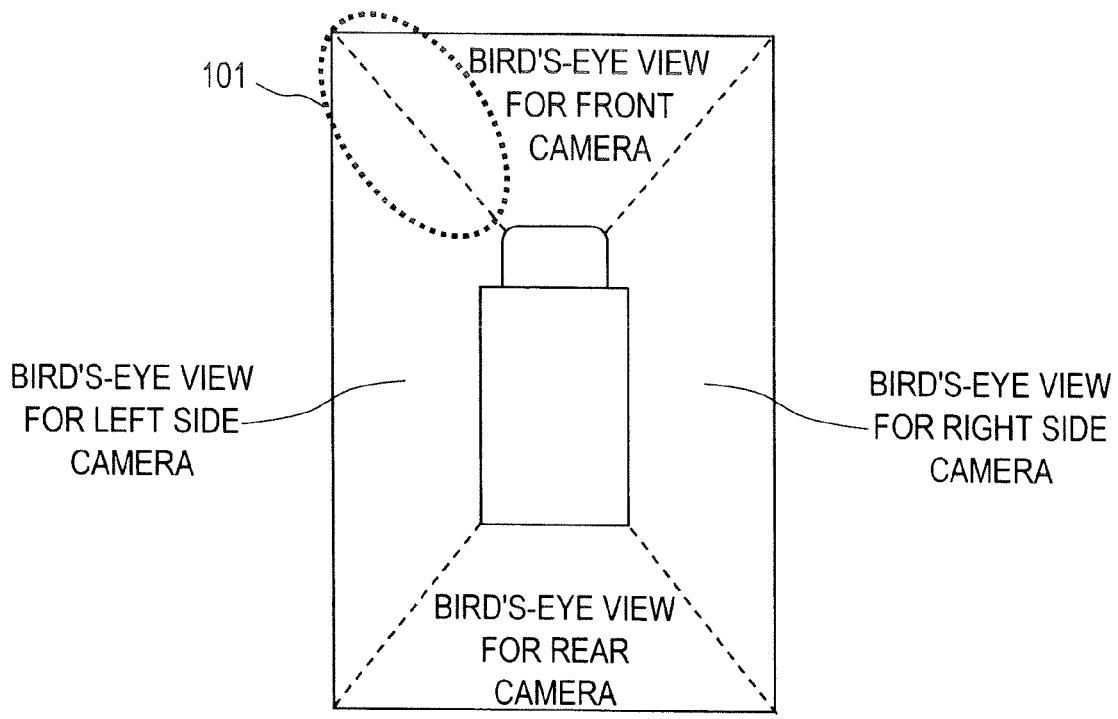
FIG. 18 is a diagram showing an all-round bird's-eye view image generated from photographed images obtained by the respective cameras of FIG. 16 according to the conventional method.
Figure 19:
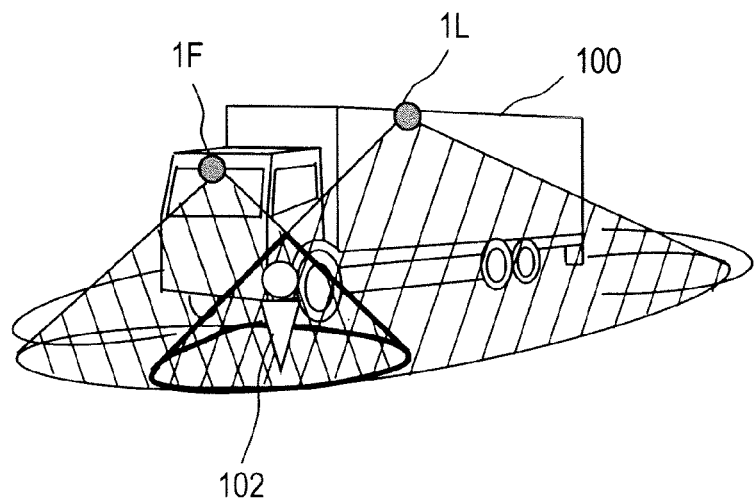
FIG. 19 is a diagram of the vehicle of FIG. 16 as viewed from diagonally left front according to the conventional method.
Figure 20:
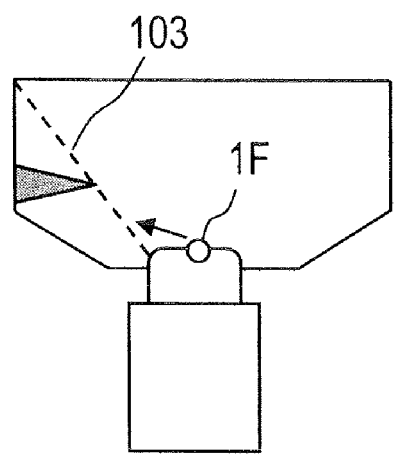
FIG. 20 is a diagram for explaining the conventional method for generating the all-round bird's-eye view image of FIG. 18.
Figure 21:
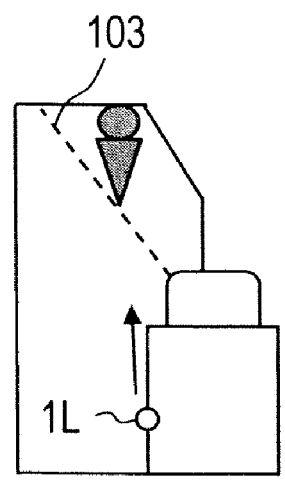
FIG. 21 is a diagram for explaining the conventional method for generating the all-round bird's-eye view image of FIG. 18.
Figure 22:
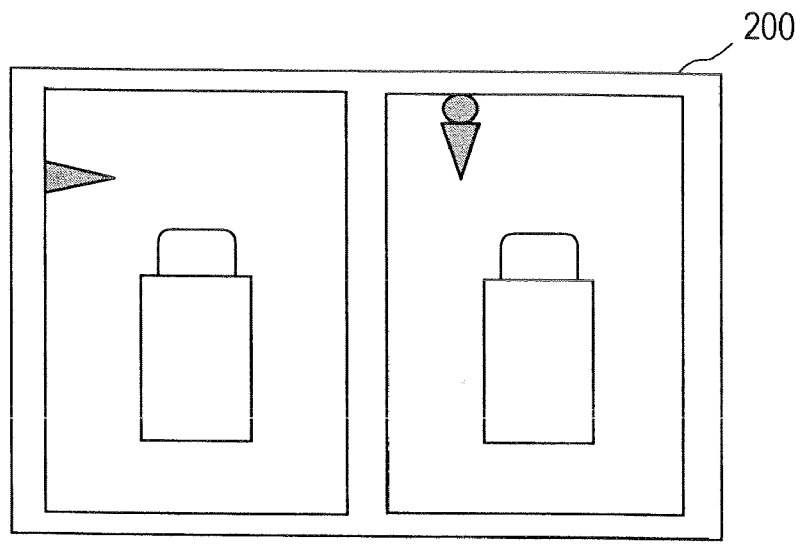
FIG. 22 is a diagram showing an example of a display image when the conventional method is employed.
Figure 23:
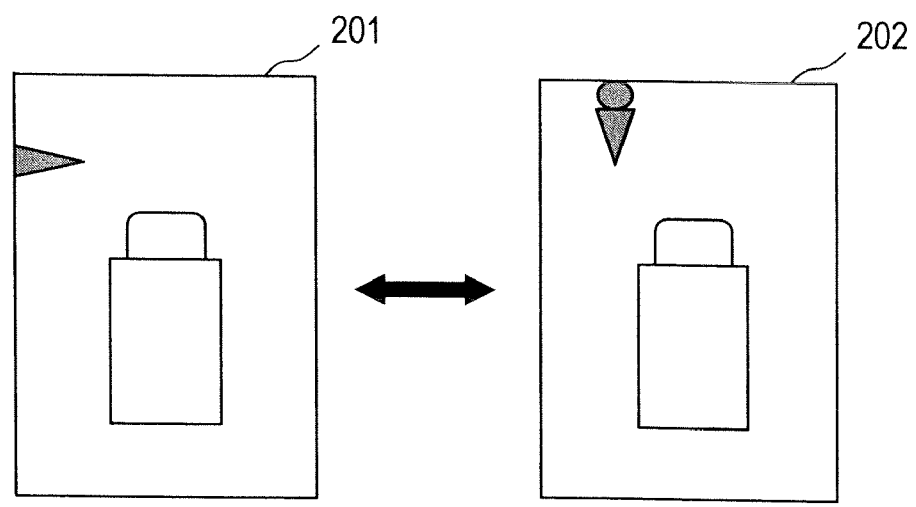
FIG. 23 is a diagram showing another example of a display image when the conventional method is employed.

FIG. 8 shows an overall block diagram of a visual field support device (vehicle surrounding visual field support device) according to this embodiment. The visual field support device according to this embodiment includes: cameras 1F, 1B, 1L, and 1R fitted at the vehicle 100 as described above; an image processing section 2 which generates an all-round bird's-eye view image from photographed images obtained by the respective cameras; and a display section (display device) 3 which displays the all-round bird's-eye view image generated by the image processing section 2. The all-round bird's-eye view image is basically the same as that shown in FIG. 18. Note that this embodiment is characterized in a technique of synthesis in the common region described above.

Used as the cameras 1F, 1B, 1L, and 1R are, for example, cameras employing CCD (Charge Coupled Devices) or cameras employing CMOS (Complementary Metal Oxide Semiconductor) image sensors. The image processing section 2 is composed of, for example, an integrated circuit. The display section 3 is composed of a liquid crystal display panel or the like. A display device included in a car navigation system or the like may be used as the display section 3 in the visual field support device.

Operation and the like of the visual field support device shown in FIG. 8 will be described in detail. Examples 1 to 3 of the invention will be described below.

Example 1

Figure 9:
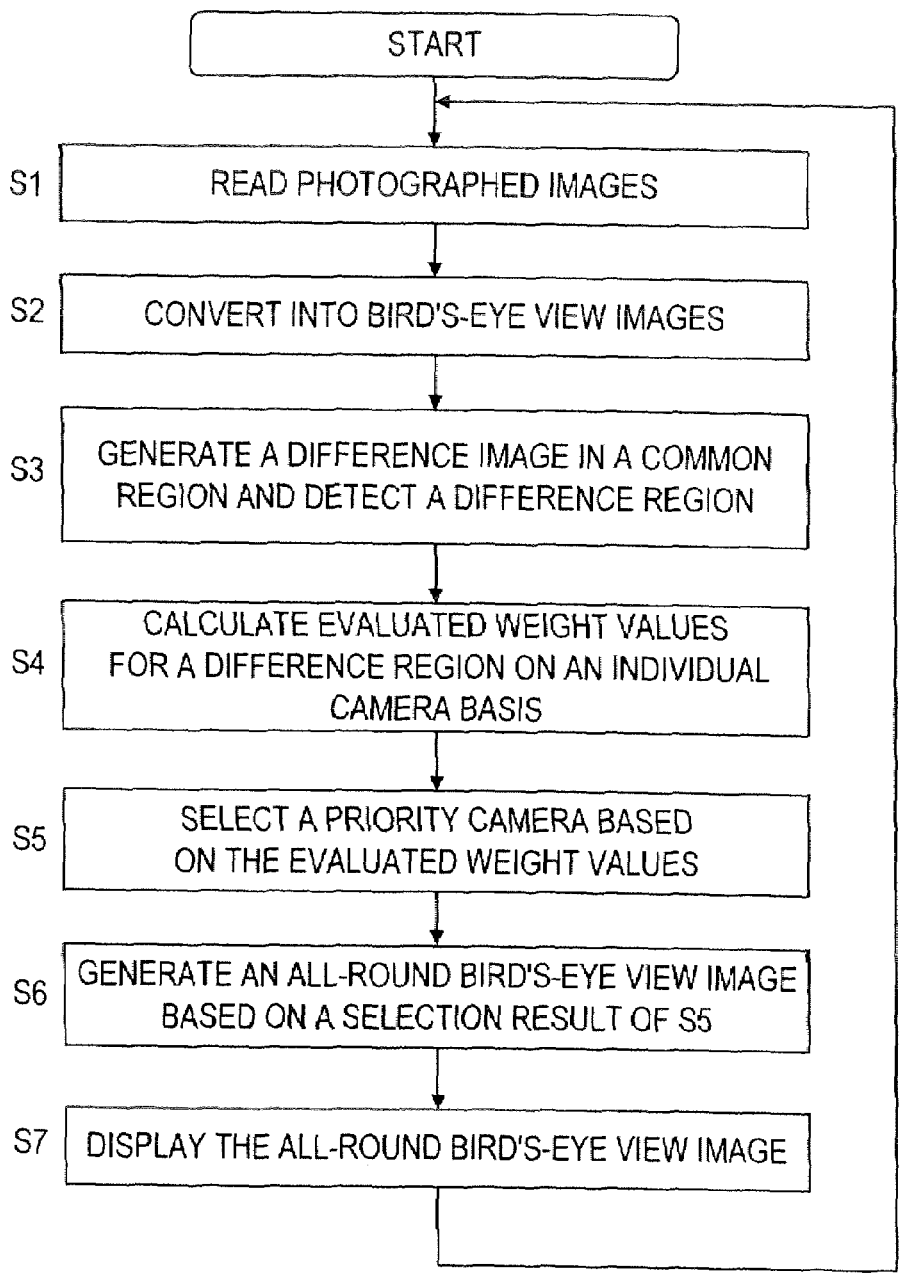
FIG. 9 is a flowchart showing procedures of processing performed by the visual field support device of FIG. 8 according to Example 1 of the invention.

First, Example 1 will be described. FIG. 9 shows a flowchart representing procedures of processing performed by the visual field support device of FIG. 8 according to Example 1. The processing in steps S2 to S6 shown in FIG. 9 is performed by the image processing section 2, the processing in step S1 is performed by the cameras and the image processing section 2, and the processing in step S7 is performed by the image processing section 2 and the display section 3.

First, the image processing section 2 reads images photographed by the respective cameras 1F, 1B, 1L, and 1R (step S1). Next, the image processing section 2 converts each of the photographed images into a bird's-eye view image by using conversion table data or the like (step S2), whereby the bird's-eye view images 10F, 10B, 10L, and 10R described above are generated. The conversion table data is previously set in accordance with the equation (7) described above. At this point, each of the photographed images can be subjected to necessary image processing such as lens distortion correction before converted into the bird's-eye view image.

Subsequently, in step S3, the image processing section 2 generates a difference image in the common region between the two bird's-eye view images, and then based on this difference image, detects a difference region in the common region between the two bird's-eye view images. Although there are four common regions as described referring to FIG. 6, the description below will be focused on the common region $C_{FL}$. The same processing is performed on the other common regions.

The difference image and the difference region for the common region $C_{FL}$ will be described. As described above, it is assumed that the solid object 14 is present in the common visual field 13 corresponding to the common region $C_{FL}$ (see FIG. 4).

Figure 10:
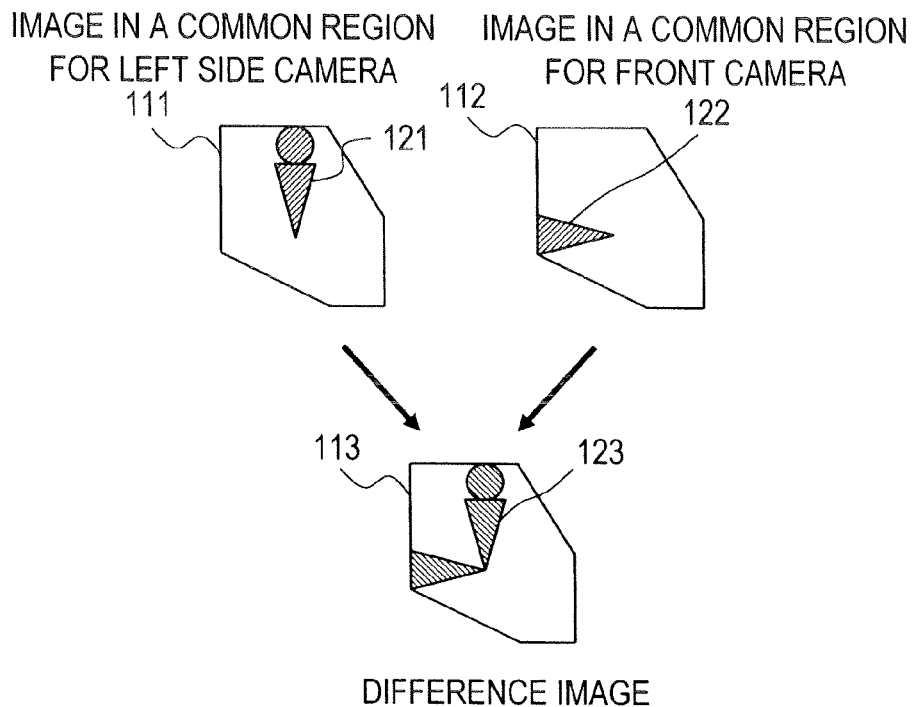
FIG. 10 is a diagram showing a difference image and a difference region in the common region of FIG. 7C.

Referring to FIG. 10, numeral 111 represents an image of the common region $C_{FL}$ within the bird's-eye view image 10L corresponding to the left side camera 1L, and numeral 112 represents an image of the common region $C_{FL}$ within the bird's-eye view image 10F corresponding to the front camera 1L. A region 121 shaded in the image 111 is a region where the solid object 14 is drawn in the image 111. A region 122 shaded in the image 112 is a region where the solid object 14 is drawn in the image 112. Now, for simplified description purposes, it is assumed that the even ground (for example, road surface) is drawn in a portion other than the region 121 in the image 111 and that the even ground (for example, road surface) is drawn in a portion other than the region 122 in the image 112.

In step S3, the image processing section 2 generates a difference image 113 by obtaining a difference between the images 111 and 112. For example, the image processing section 2 perceives the images 111 and 112 as gray images and generates, as a gray image, the difference image 113 of the images 111 and 112. Pixel values of respective pixels (values of pixel signals) in the difference image 113 are expressed by difference (or an absolute value of difference) between pixel values of respective pixels in the image 111 and pixel values of respective pixels in the image 112. Then, the image processing section 2 identifies a difference region 123 from the difference image 113. In FIG. 10, the difference region 123 is a region shaded inside the difference image 113. For example, in the difference image 113, the difference region 123 is defined as a region where the values of the pixel signals of the pixels forming the difference image 113 are equal to or larger than a predetermined threshold. The pixel signal is a brightness signal representing the brightness of the pixel or a color signal (color difference signal or the like) representing the color of the pixel.

The difference region 123 is a region combining together the regions 121 and 122. Upon the conversion into the bird's-eye view images, predetermined conversion is performed so that each of the bird's-eye view images has continuity on the ground. Thus, for the difference image 113, a difference value is obtained which is relatively large for only a region related to the presence of the solid object. Thus, the difference region 123 can be detected by the processing described above. Alternatively, edge detection may be performed on the difference image 113 to detect the contour surrounding the difference region 123 and then the inside of the detected contour may be specified as the difference region 123. Alternatively, edge detection may be performed individually on the images 111 and 112 to extract difference in edge detection results (presence or absence of edge) between the images 111 and 112 and then detect the difference region 123 from an image portion having the difference.

The processing in step S4 following step S3 will be described, referring to the common region $C_{FL}$ as an example. The same processing applies to the other common regions.

In step S4, weight value table data set for each camera is referenced. For the common region $C_{FL}$, the weight value table data corresponding to the front camera 1F and the weight value table data corresponding to the left side camera 1L are previously set.

Figure 11:
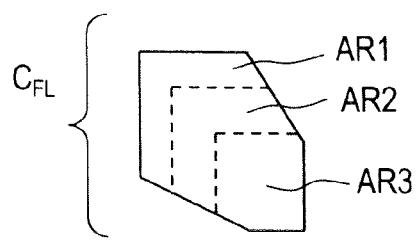
FIG. 11 is a diagram for explaining the processing of step S4 of FIG. 9, showing the common region of FIG. 7C divided into three regions.

In each weight value table data, weight values corresponding to respective pixel positions of the image in the common region $C_{FL}$ are defined. For example, the common region $C_{FL}$ is divided into three regions AR1, AR2, and AR3 as show in FIG. 11. The weight value of the pixel belonging to the region AR1, the weight value of the pixel belonging to the region AR2, and the weight value of the pixel belonging to the region AR3 are stored into each weight value table data.

Figure 12:
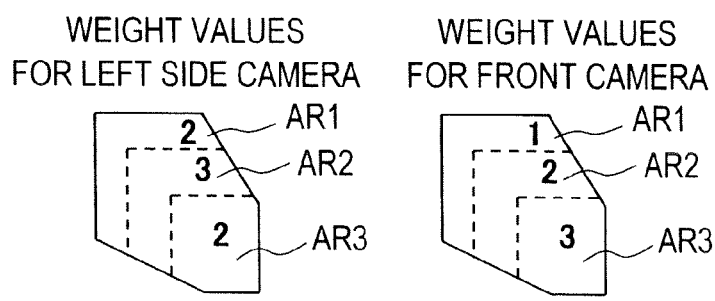
FIG. 12 is a diagram for explaining the processing of step S4 of FIG. 9, showing weight values for the front camera and weight values for the left side camera for the common region of FIG. 7C.

The weight values defined in relation to the pixel position of the image in the common region $C_{FL}$ are set differently among the different weight value table data. FIG. 12 shows an example of setting the weight values corresponding to the front camera F and the weight values corresponding to the left side camera 1L. For example, in the weight value table data corresponding to the front camera 1F, the weight value $W_{F1}$ for the pixel belonging to the region AR1 is 1, the weight value $W_{F2}$ for the pixel belonging to the region AR2 is 2, and the weight value $W_{F3}$ for the pixel belonging to the region AR3 is 3. On the other hand, in the weight value table data corresponding to the left side camera 1L, the weight value $W_{L1}$ for the pixel belonging to the region AR1 is 2, the weight value $W_{L2}$ for the pixel belonging to the region AR2 is 3, and the weight value $W_{L3}$ for the pixel belonging to the region AR3 is 2.

In step S4, the weight values corresponding to the pixels belonging to the difference region 123 are summed up for each of the cameras (in other word, for each of the bird's-eye view images), and this summed value is provided as an evaluated weight value. For explanatory purposes, as shown in FIG. 13, the difference region 123 is considered as being divided into a partial difference region 123a corresponding to the region 121 (see FIG. 10) and a partial difference region 123b corresponding to the region 122.

FIG. 14 shows the number of pixels in the partial difference region 123a and the number of pixels in the partial difference region 123b, respectively belonging to the regions AR1 to AR3. Assume that the number of pixels in the partial difference region 123a belonging to the regions AR1 to AR3 are 15, 18, and 2, respectively, and the number of pixels in the partial difference region 123b belonging to the regions AR1 to AR3 are 12, 5, and 0, respectively In this case, the evaluated weight value for the front camera 1F is expressed by:

"$W_{F1} \times (15+12) + W_{F2} \times (18+5) + W_{F3} \times (2+0)$".

As described above, where "$W_{F1}=1, W_{F2}=2, W_{F3}=3$",

"$1 \times (15+12) + 2 \times (18+5) + 3 \times (2+0) = 79$" is obtained.

On the other hand, the evaluated weight value for the left side camera 1L is expressed by:

"$W_{L1} \times (15+12) + W_{L2} \times (18+5) + W_{L3} \times (2+0)$".

As described above, where "$W_{L1}=2, W_{L2}=3, W_{L3}=2$",

"$2 \times (15+12) + 3 \times (18+5) + 2 \times (2+0) = 127$" is obtained.

In step S5 following step S4, based on the evaluated weight values calculated in step S4, a priority camera is selected which provides the bird's eye view image including the image to be adopted as the image of the common region. As described above, when, concerning the common region $C_{FL}$, the evaluated weight value for the front camera 1F is 79 and the evaluated weight value for the left side camera 1L is 127, the left side camera 1L corresponding to the larger evaluated weight value is selected as the priority camera. In other word, the bird's-eye view image 10L corresponding to the left side camera 1L is selected as the bird's-eye view image to be adopted (adopted image). The priority cameras are selected in the same manner for the other common regions.

Then, in step S6, the image processing section 2, based on the results of selection of the priority camera, generates an all-round bird's-eye view image. That is, adopting, as an image of a common region in the all-round bird's-eye view image, the image of the common region in the bird's-eye view image based on the image photographed by the priority camera, the image processing section 2 generates the all-round bird's-eye view image. For example, when the left side camera 1L is selected as the priority camera for the common region $C_{FL}$, the image of the common region $C_{FL}$ in the bird's-eye view image 10L is provided as the image of the common region $C_{FL}$ in the all-round bird's-eye view image. The same applies to the other common regions.

FIG. 15 shows an example of the all-round bird's-eye view image obtained. In this all-round bird's-eye view image, an entire image of the solid object appears. For images of the regions other than the common region in the all-round bird's-eye view image, the bird's-eye view images 10F, 10B, 10L, and 10R are arranged, as shown in FIG. 6. That is, on the all-round bird's-eye view image, the images based on the bird's-eye view images 10F, 10B, 10L, and 10R are respectively drawn at the front, back, left, and right of the drawing region of the vehicle.

In step S7 following step S6, the image processing section 2 generates a required video signal and outputs it to the display section 3 so that the all-round bird's-eye view image generated in step S6 is displayed on the display section 3. Consequently, the all-round bird's-eye view image as shown in FIG. 15 is displayed on the display section 3. When step S7 ends, the processing returns to step S1, so that the processing of steps S1 to S7 is repeated so as to periodically update the all-round bird's-eye view image.

The weight values described above are set in accordance with the installation positions of the respective cameras with respect to the vehicle 100, upon which the shape of the vehicle 100 and the like are also taken into consideration. This embodiment is, as shown in FIG. 3, based on the assumption that the vehicle 100 is a truck composed of a driver's cabin and a luggage compartment having a height larger than that of the driver's cabin and that the front camera 1F is installed at the top of the driver's cabin and the left side camera 1L is installed at the top of the luggage compartment located higher than the front camera 1F.

The front camera 1F can precisely capture a solid object located close thereto but has difficulty in capturing an entire image of a solid object located distant therefrom due to its low installation position. On the other hand, the left side camera 1L can easily capture an entire image of a solid object by viewing the solid object from higher position, but has difficulty in capturing an entire image of a solid object located close to the front camera 1F.

Considering these facts, in order that the front camera 1F is likely to be selected as a priority camera when a solid object is present at position relatively close to the front camera 1F, the weight values for the front camera 1F are set relatively large in a region close to the front camera 1F, as shown in FIG. 12. On the other hand, in order that the left side camera 1L is likely to be selected as a priority camera when a solid object is present at position distant from the front camera 1F, the weight values for the left side camera 1L are set relatively large in a region distant form the front camera 1F.

Setting the weight values in accordance with the installation position of each of the cameras in this manner makes it easy to display the entire image of the solid object as shown in FIG. 15. Specifically, the camera is automatically selected which is expected to be capable of obtaining an image from which the driver can easily recognize the condition of the surrounding of the vehicle and then the image of the common region in the all-round bird's-eye view image is formed, which permits display of a video more suitable for condition recognition than a conventional one.

A difference in the position and shape of the difference region in the common region may result in a difference in the priority camera to be selected. Even with the same shape of the difference region, a difference in the position of the difference region in the common region can result in a difference in the priority camera to be selected. That is, in this embodiment, the priority camera is selected in accordance with the position of the difference region in the common region (in other word, in accordance with the position of the solid object in relation to the vehicle 100). An advantage in adopting this selection method can be understood from the above description. Specifically, for example, for the common region $C_{FL}$, when the solid object is present at position relatively close to the front camera 1F, the front camera 1F is likely to be selected as the priority camera, and when the solid object is present at position relatively distant from the front camera 1F, the left side camera 1L which views the solid object from higher position is likely to be selected as the priority camera. As a result, a video more suitable for condition recognition than a conventional one can be displayed.

In step S5, each of the evaluated weight values described above may be corrected in accordance with the driving condition of the vehicle 100, and the priority camera (priority bird's-eye view image) may be selected based on each of the evaluated weight values corrected.

The driving condition includes: condition of the gear of the vehicle 100, direction of handle operation (travel direction of the vehicle 100), speed of the vehicle 100, and the like. Information concerning the driving condition is given from a portion (for example, portion included in the vehicle 100) detecting this information to the image processing section 2.

Consider a case where the evaluated weight values for the front camera 1F and the left side camera 1L before this correction are 79 and 127, respectively, as described above. For example, when the vehicle 100 takes a left turn, the evaluated weight value for the front camera 1F is multiplied by a coefficient 1 and the evaluated weight value for the left side camera 1L is multiplied by a coefficient 2. In this case, the evaluated weight values for the front camera 1F and the left side camera 1L after correction are 79 (=79×1) and 254 (=127×2), respectively. Since 79 is smaller than 254, the left side camera 1L is selected as the priority camera. In addition, for example, when the vehicle 100 moves forward, the evaluated weight value for the front camera 1F is multiplied by a coefficient 2 and the evaluated weight value for the left side camera 1L is multiplied by a coefficient 1. In this case, the evaluated weight values for the front camera 1F and the left side camera 1L after correction are 158 (=79×2) and 127 (=127×1), respectively. Since 158 is larger than 127, the front camera 1F is selected as the priority camera.

When the vehicle 100 takes a left turn, the need for a video of the left side of the vehicle 100 is relatively great while the need for a video of the front of the vehicle 100 is relatively small. When the vehicle 100 moves forward, the need for the video of the left side of the vehicle 100 is relatively small while the need for the video of the front of the vehicle 100 is relatively great. Taking this into consideration, the coefficients are set to correct the evaluated weight values as described above. As a result, a suitable video also considering the driving operation can be displayed.

The illustration above refers to the left turn and the forward movement. Note that the evaluated weight values are corrected in accordance with the driving condition such as a right turn, backward movement, or the like, based on the same idea. Moreover, the degree of correction may be changed in accordance with the condition of the gear of the vehicle 100, speed of the vehicle 100, or the like.

Example 2

Figure 24:
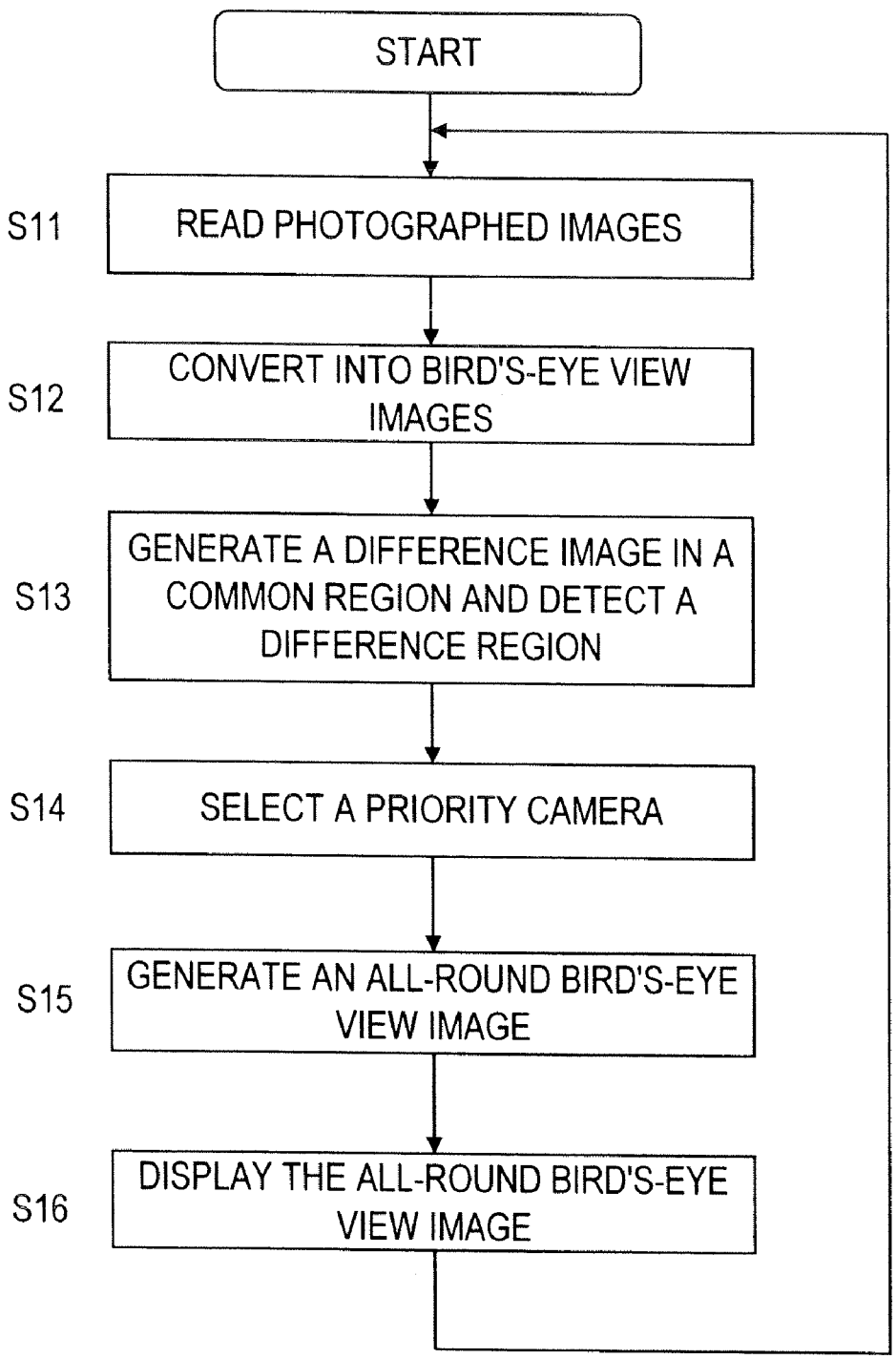
FIG. 24 is a flowchart showing procedures of processing performed by a visual field support device of FIG. 8 according to Example 2 of the invention.

Next, Example 2 of the invention will be described. FIG. 24 shows a flowchart representing procedures of processing performed by the visual field support device of FIG. 8 according to Example 2. The processing in steps S12 to S15 shown in FIG. 24 is performed by the image processing section 2, the processing in step S11 is performed by the cameras and the image processing section 2, and the processing in step S16 is performed by the image processing section 2 and the display section 3.

First, the image processing section 2 reads images photographed by the respective cameras 1F, 1B, 1L, and 1R (step S11). Next, the image processing section 2 converts each of the photographed images into a bird's-eye view image by using conversion table data or the like (step S12), whereby the bird's-eye view images 10F, 10B, 10L, and 10R described above are generated. The conversion table data is previously set in accordance with the equation (7) described above. At this point, each of the photographed images can be subjected to necessary image processing such as lens distortion correction before converted into the bird's-eye view image.

Subsequently, in step S13, the image processing section 2 generates a difference image in a common region between the two bird's-eye view images, and then based on this difference image, detects a difference region in the common region between the two bird's-eye view images. Although there are four common regions as described referring to FIG. 6, the description below will be focused on the common region $C_{FL}$. The same processing is performed on the other common regions.

The difference image and the difference region for the common region $C_{FL}$ are the same as those described in Example 1 with reference to FIG. 10. As described above, it is assumed that the solid object 14 is present in the common visual field 13 corresponding to the common region $C_{FL}$ (see FIG. 4).

Description of this Example also refers to FIG. 10. The processing in step S13 is the same as the processing in step S3 (see FIG. 9) in Example 1. Specifically, in step S13, the image processing section 2 generates a difference image 113 by obtaining a difference between images 111 and 112. Then the image processing section 2 specifies a difference region 123 from the difference image 113. As described above, in FIG. 10, the difference region 123 is a region shaded inside the difference image 113. The way of specifying the difference region 123 is the same as that described in Example 1. That is, for example, in the difference image 113, the difference region 123 is defined as a region where values of pixel signals of pixels forming the difference image 113 are equal to or larger than a predetermined threshold.

The difference region 123 is a region (solid object reflecting region) synthesizing a region 121 where the solid object 14 is drawn in the image 111 and a region 122 where the solid object 14 is drawn in the image 112. Upon the conversion into the bird's-eye view images, predetermined conversion is performed so that each of the bird's-eye view images has continuity on the ground. Thus, for the difference image 113, a difference value is obtained which is relatively large for only a region related to the presence of the solid object. Thus, the difference region 123 can be detected by the processing described above.

Figure 25A:
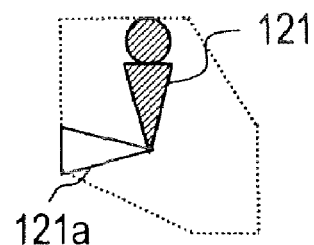
FIG. 25A is a diagram showing a difference region for an image obtained by the left side camera.
Figure 25B:
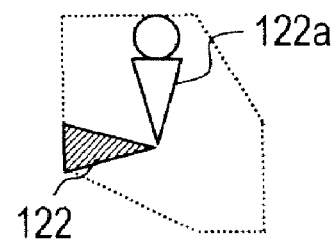
FIG. 25B is a diagram showing a difference region for an image obtained by the front camera.

Now, consider the difference region 123 in each of the bird's-eye view images 10L and 10F. As shown in FIG. 25A, for the bird's-eye view image 10L corresponding to the left side camera 1L, the difference region 123 is formed of a region where the solid object 14 photographed by the left side camera 1L is drawn (that is, a region 121) and a blocking region 121a blocked by the solid object 14 as viewed from the front camera 1F. In the bird's-eye view image 10L, the ground appears in this blocking region 121a. On the other hand, as shown in FIG. 25B, for the bird's-eye view image 10F corresponding to the front camera 1F, the difference region 123 is formed of a region where the solid object 14 photographed by the front camera 1F is drawn (that is, a region 122) and a blocking region 122a blocked by the solid object 14 as viewed from the left side camera 1L. In the bird's-eye view image 10F, the ground appears in this blocking region 122a.

Considering these characteristics, upon the synthesis of the bird's-eye view images 10L and 10F, an image in either one of the bird's-eye view images 10L and 10F is adopted for the difference region 123 (a detailed example of its processing will be described later). As a result, the solid object 14 can be appropriately displayed without being lost.

In step S14 following step S13, a priority camera is selected which provides a bird's-eye view image including an image to be adopted as an image of a difference region (for example, difference region 123). For the difference region 123, either one of the front camera 1F and the left side camera 1L is selected as the priority camera. For example, the left side camera 1L installed at higher position is selected as the priority camera for the difference region 123, because the left side camera 1L installed at the higher position can capture the entire image of the solid object with relative ease since it views the solid object from a higher visual point. The priority cameras for the other difference regions are selected in the same manner. For the selection of the priority camera based on height of installation position, it is previously defined in accordance with height of each of the cameras which one of the cameras is selected as the priority camera. There are various other possible methods of selecting a priority camera, which will be described in Example 3 later.

In step S15 following step S14, the image processing section 2, with reference to results of the processing in steps S13 and 14, generates an all-round bird's-eye view image. Specifically, the image processing section 2 generates the all-round bird's-eye view image from the bird's-eye view images as described with reference to FIGS. 5, 6, and the like. For the difference region in the common region, the image of the difference region based on the image photographed by the priority camera is adopted. For example, for the common region $C_{FL}$, when the difference region 123 is detected in step S13 and the left side camera 1L is selected as the priority camera in step S14, an image of the difference region 123 in the bird's-eye view image 10L (that is, image of a region combining together the regions 121 and 121a in FIG. 25A) is adopted as an image of the difference region 123 in the all-round bird's-eye view image.

For a region excluding the difference region 123 in the common region $C_{FL}$, an image of this region (region excluding the difference region 123 in the common region $C_{FL}$) in the all-round bird's-eye view image is generated by averaging pixel signals in the bird's-eye view images 10F and 10L. This averaging permits synthesis of consecutive images. However, since the solid object is not drawn in the region other than the difference region 123 (in other word, there is no difference between the both bird's-eye view images), the synthesis processing can be performed by using only one of the bird's-eye view images 10F and 10L. That is, for the region excluding the difference region 123 in the common region $C_{FL}$, an image of either one of the bird's-eye view images 10F and 10L may be directly adopted as an image of this region (region excluding the difference region 123 in the common region $C_{FL}$) in the all-round bird's-eye view image. The processing in step S15 has been described focusing on the common region $C_{FL}$, but the same processing applies to the other common regions.

Figure 26:
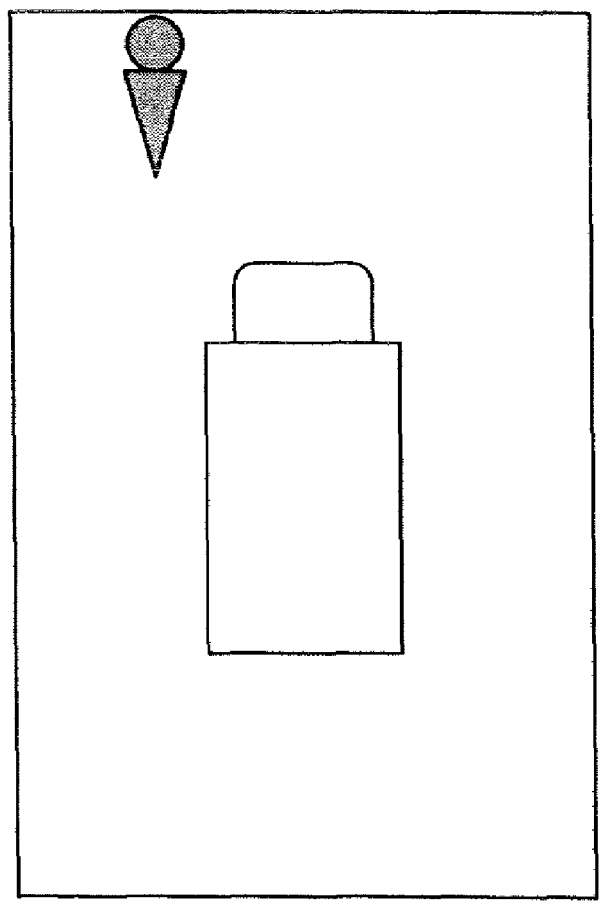
FIG. 26 is a diagram showing an example of an all-round bird's-eye view image generated by the image processing section of FIG. 8 according to Example 2 of the invention.

FIG. 26 shows an example of the all-round bird's-eye view image obtained. In this example, in which the left side camera 1L is a priority camera for the difference region 123, an entire image of the solid object appears in all-round bird's-eye view image. For images of the regions other than the common region in the all-round bird's-eye view image, the bird's-eye view images 10F, 10B, 10L, and 10R are arranged, as shown in FIG. 6. That is, on the all-round bird's-eye view image, the images based on the bird's-eye view images 10F, 10B, 10L, and 10R are respectively drawn at the front, back, left, and right of the drawing region of the vehicle.

In step S16 following step S15, the image processing section 2 generates a required video signal and outputs it to the display section 3 so that the all-round bird's-eye view image generated in step S15 is displayed on the display section 3. Consequently, the all-round bird's-eye view image as shown in FIG. 26 is displayed on the display section 3. When step S16 ends, the processing returns to step S11, so that the processing of steps S11 to S16 is repeated so as to periodically update the all-round bird's-eye view image.

Performing the synthesis processing as in this Example can avoid a problem that the solid object disappears from the display screen and also can display the solid object which does not result in a double image thereof. Moreover, for the regions other than the region displaying the solid object, continuous images are synthesized, so that a video suitable for recognizing condition of the surrounding of the vehicle can be displayed.

Example 3

Next, Example 3 of the invention will be described. In Example 3, another example of the method for selecting a priority camera performed in step S14 of FIG. 24 will be described. Example 3 is performed in combination with the Example 2.

As another example of the method for selecting a priority camera, a first, a second, and a third selection methods will be illustrated. Focusing on the difference region 123 in the common region $C_{FL}$, the first to third selection methods will be described. Needless to say, a priority camera is selected in the same manner for the other difference regions. The first to third selection methods can be combined arbitrarily as long as no inconsistency arises.

[First Selection Method]

The first selection method will be described. In the first selection method, distances between the solid object 14 and the cameras are referenced. Recognizing the position of the difference region 123 on the image permits specifying, in an actual space, a distance between the solid object 14 and the front camera 1F and a distance between the solid object 14 and the left side camera 1L. The both distances are compared with each other, and the camera with the shorter distance is selected as the priority camera. This selection is based on the assumption that, when other conditions are identical, the camera with the shorter distance can capture the solid object 14 more precisely.

[Second Selection Method]

The second selection method will be described. In the second selection method, the travel direction of the vehicle 100 is referenced. Information on the travel direction is given from a portion for detecting this information (this portion is included, for example, in the vehicle 100) to the image processing section 2.

For example, for the difference region 123, the left side camera 1L, is selected as the priority camera when the vehicle 100 takes a left turn while the front camera 1F is selected as the priority camera when the vehicle 100 moves forward. When the vehicle 100 takes a left turn, the need for a video of the left side of the vehicle 100 is relatively great, while the need for a video of the front of the vehicle 100 is relatively small. When the vehicle 100 moves forward, the need for the video of the left side of the vehicle 100 is relatively small, while the need for the video of the front of the vehicle 100 is relatively great. Taking this into consideration, the priority cameras are selected as described above. Consequently, a suitable video also considering the travel direction of the vehicle 100 can be displayed.

The illustration above refers to the left turn and the forward movement. Note that, based on the same idea, the priority camera is selected in accordance with driving condition such as a right turn, rearward movement, or the like.

[Third Selection Method]

The third selection method will be described. In the third selection method, the priority camera is selected based on the position of the difference region 123 in the common region $C_{FL}$. The third selection method is basically identical to the method for selecting a priority camera in Example 1. The third selection method will be described, referring to details of description of Example 1 and the drawings also referenced in Example 1.

In the third selection method, weight value table data set for each camera is referenced. For the common region $C_{FL}$, the weight value table data corresponding to the front camera 1F and the weight value table data corresponding to the left side camera 1L are previously set.

In each weight value table data, weight values corresponding to respective pixel positions of the image in the common region $C_{FL}$ are defined. For example, the common region $C_{FL}$ is divided into three regions AR1, AR2, and AR3 as show in FIG. 11. The weight value of the pixel belonging to the region AR1, the weight value of the pixel belonging to the region AR2, and the weight value of the pixel belonging to the region AR3 are stored into each weight value table data.

As in Example 1, the weight values defined in relation to the pixel positions of the image of the common region $C_{FL}$ are set differently among the different weight value table data. The example of setting the weight values corresponding to FIG. 12 is also applied to the third selection method. For example, in the weight value table data corresponding to the front camera 1F, the weight value $W_{F1}$ for the pixel belonging to the region AR1 is 1, the weight value $W_{F2}$ for the pixel belonging to the region AR2 is 2, and the weight value $W_{F3}$ for the pixel belonging to the region AR3 is 3. On the other hand, in the weight value table data corresponding to the left side camera 1L, the weight value $W_{L1}$ for the pixel belonging to the region AR1 is 2, the weight value $W_{L2}$ for the pixel belonging to the region AR2 is 3, and the weight value $W_{L3}$ for the pixel belonging to the region AR3 is 2.

Then the weight values corresponding to the pixels belonging to the difference region 123 are summed up for each of the cameras (in other word, for each of the bird's-eye view images), and this summed value is provided as an evaluated weight value. In this condition, as in Example 1, as shown in FIG. 13, the difference region 123 is considered to be divided into a partial difference region 123a corresponding to the region 121 (see FIG. 10) and a partial difference region 123b corresponding to the region 122.

Now, as is the case with the numerical example of Example 1 (see FIG. 14), the number of pixels in the partial difference region 123a belonging to the regions AR1 to AR3 are 15, 18, and 2, respectively, and the number of pixels in the partial difference region 123b belonging to the regions AR1 to AR3 are 12, 5, and 0, respectively.

In this case, as in Example 1, the evaluated weight value for the front camera 1F is expressed by:

"$W_{F1} \times (15+12) + W_{F2} \times (18+5) + W_{F3} \times (2+0)$".

As described above, where "$W_{F1}=1, W_{F2}=2, W_{F3}=3$",

"$1 \times (15+12) + 2 \times (18+5) + 3 \times (2+0) = 79$" is obtained.

On the other hand, as in Example 1, the evaluated weight value for the left side camera 1L is expressed by:

"$W_{L1} \times (15+12) + W_{L2} \times (18+5) + W_{L3} \times (2+0)$".

As described above, where "$W_{L1}=2, W_{L2}=3, W_{L3}=2$",

"$2 \times (15+12) + 3 \times (18+5) + 2 \times (2+0) = 127$" is obtained.

Of the both evaluated weight values which have been calculated, the camera corresponding to the larger evaluated weight value is selected as the priority camera. In this example, since 79<127, the left side camera 1L is selected as the priority camera.

The front camera 1F can precisely capture a solid object located close thereto but has difficulty in capturing an entire image of a solid object located distant therefrom due to its low installation position. On the other hand, the left side camera 1L can easily capture an entire image of a solid object by viewing the solid object from higher position, but has difficulty in capturing an entire image of a solid object located close to the front camera 1F.

Considering these facts, in order that the front camera 1F is likely to be selected as a priority camera when a solid object is present at position relatively close to the front camera 1F, the weight values for the front camera 1F are set relatively large in a region close to the front camera 1F, as shown in FIG. 12. On the other hand, in order that the left side camera 1L is likely to be selected as a priority camera when a solid object is present at position distant from the front camera 1F, the weight values for the left side camera 1L are set relatively large in a region distant form the front camera 1F.

Setting the weight values in accordance with the installation position of the respective cameras and the like in this manner makes it easy to display the entire image of the solid object. When the third selection method is adopted, a difference in the position and shape of the difference region in the common region may result in a difference in the priority camera to be selected. Even with the same shape of the difference region, a difference in the position of the difference region in the common region can result in a difference in the priority camera to be selected. That is, in the third selection method, the priority camera is selected in accordance with the position of the difference region in the common region (in other word, in accordance with the position of the solid object in relation to the vehicle 100). An advantage in adopting this selection method can be understood from the above description.

The visual field support device described above is just an example of the embodiments of the invention, and the invention includes various Modified Examples (or other Examples). Hereinafter, as the Modified Examples (or other Examples) of the invention, a first to a fifth Modified Examples will be illustrated. Details described in the Modified Examples can be arbitrarily combined together as long as no inconsistency arises.

First Modified Example

The specific values shown in the above description is just illustrative, and it is needless to say that they can be changed to various values. The weight values described above are changed as appropriate in accordance with the installation position of the cameras, the shape of a vehicle where the cameras are installed, and the like.

Second Modified Example

In Example 1 and the third selection method of Example 3, an example is illustrated in which the common region $C_{FL}$ is divided into three regions AR1 to AR3, although the number of divided regions may be other than 3. An example is provided in which the method for dividing the common region $C_{FL}$ into regions is the same between the cameras 1F and 1L (bird's-eye view images 10F and 10L), but this method for dividing may differ among the different cameras.

Note that such division of the region is not necessary, as long as the weight values are defined in correspondence with the position of each pixel in the image of the common region $C_{FL}$, and in extreme cases, weight values corresponding to two different arbitrary pixel positions may all differ from each other.

In the example of setting the weight values shown in FIG. 12, the weight values corresponding to the same pixel position all differ between the cameras 1F and 1L (bird's-eye view images 10F and 10L). Alternatively, they may differ only partially.

Third Modified Example

The image processing section 2 of FIG. 8 can be realized by hardware, software, or a combination of hardware and software. All or part of functions achieved by the image processing section 2 may be described as a program, which may be executed on a computer to thereby achieve all or part of the functions.

Fourth Modified Example

The image processing section 2 includes: a visual point conversion section which converts images photographed by the respective cameras into bird's-eye view images through visual point conversion; and an image synthesis section which synthesizes the bird's-eye view images obtained through the conversion to thereby generate a synthetic bird's-eye view image. As the synthetic bird's-eye view image, an all-round bird's-eye view image is illustrated in the above embodiment.

Fifth Modified Example

In the above embodiment, the vehicle 100 is exemplified by a truck. However, the invention is also applicable to normal passenger cars and the like, regardless of the type of vehicle.

Further, a plurality of cameras (for example, the cameras 1F, 1B, 1L, and 1R described above) can be installed in a place other than the vehicle. That is, the invention is also applicable to a monitoring system installed in a building or the like. Also in the monitoring system of this type, as is the case with the above embodiment, there is a common visual field between a plurality of cameras and there are common regions ($C_{FL}$ and the like) between different bird's-eye view images. To form a synthetic bird's-eye view image by synthesizing the bird's-eye view images, selection of a priority camera and (or) synthesis of images of the common regions may be performed by employing the same method as employed in the above embodiment.

What is claimed is:

1. An image processor comprising:
   a visual point conversion section respectively converting images photographed by an n-number of photography apparatuses (where n is an integer of 2 or larger) into bird's-eye view images as viewed from a virtual visual point;
   and an image synthesis section synthesizing the obtained bird's-eye view images to generate a synthetic bird's-eye view image,
   the image processor generating a video signal for displaying the synthetic bird's-eye view image on a display device,
   wherein the image synthesis section compares, between a plurality of the bird's-eye view images, images of a common region where the plurality of the bird's-eye view images overlap upon the synthesis to thereby specify a difference region between the plurality of the bird's-eye view images in the common region,
   wherein weight values corresponding to respective pixel positions of the image in the common region are set for each of the plurality of the bird's-eye view images,
   wherein part or all of the set weight values differ between the plurality of the bird's-eye view images, and wherein the image synthesis section
sums up the weight values corresponding to pixels included in the difference region to thereby calculate a summed value for each of the plurality of the bird's-eye view images,
selects, based on the summed values, one bird's-eye view image from among the plurality of the bird's-eye view images as an image to be adopted, and
adopts, as an image of the common region in the synthetic bird's-eye view image, the image of the common region in the image to be adopted.

2. The image processor according to claim 1, wherein the image synthesis section compares the summed values between the plurality of the bird's-eye view images to thereby select the image to be adopted.

3. The image processor according to claim 1, wherein the n-number of photographing apparatuses are installed at a vehicle and photograph surrounding of the vehicle, and
wherein the image synthesis section, based on driving condition of the vehicle in addition to the summed values, selects the image to be adopted.

4. The image processor according to claim 1, wherein the weight values are set based on installation positions of a plurality of the photographing apparatuses corresponding to the plurality of the bird's-eye view images.

5. A visual field support device comprising:
the image processor according to claim 1; and
at least one of the n-number of photographing apparatuses and the display device.

6. A visual support method for respectively converting images photographed by an n-number of photographing apparatuses (where n is an integer of 2 or larger) into bird's-eye view images as viewed from a virtual visual point and displaying on a display device a synthetic bird's-eye view image obtained by synthesizing the obtained bird's-eye view images,
wherein the visual support method compares, between a plurality of the bird's-eye view images, images of a common region where the plurality of the bird's-eye view images overlap upon the synthesis to thereby specify a difference region between the plurality of the bird's-eye view images in the common region,
wherein weight values corresponding to respective pixel positions of the image in the common region are set for each of the plurality of the bird's-eye view images,
wherein part or all of the set weight values differ between the plurality of the bird's-eye view images, and
wherein the visual support method
sums up the weight values corresponding to pixels included in the difference region to thereby calculate a summed value for each of the plurality of the bird's-eye view images,
selects, based on the summed values, one bird's-eye view image from among the plurality of the bird's-eye view images as an image to be adopted, and
adopts, as an image of the common region in the synthetic bird's-eye view image, the image of the common region in the image to be adopted.

7. An image processor comprising:
a visual point conversion section respectively converting images photographed by an n-number of photographing apparatuses (where n is an integer of 2 or larger) into bird's-eye view images as viewed from a virtual visual point; and
an image synthesis section synthesizing the obtained bird's-eye view images to generate a synthetic bird's-eye view image,
the image processor generating a video signal for displaying the synthetic bird's-eye view image on a display device,
wherein the image synthesis section, when a solid object having some height is present in a common visual field photographed in common by a plurality of the photographing apparatuses,
detects a solid object reflecting region corresponding to a synthetic region of regions where the solid object is drawn in a plurality of the bird's-eye view images obtained from the plurality of the photographing apparatuses,
adopts, as an image of the solid object reflecting region in the synthetic bird's-eye view image, an image of the solid object reflecting region in one of the plurality of the bird's-eye view images, and
compares, between the plurality of the bird's-eye view images, images of a common region where the plurality of the bird's-eye view images overlap upon the synthesis to thereby detect the solid object reflecting region.

8. The image processor according to claim 7, wherein the image synthesis section compares, between the plurality of the bird's-eye view images, images of the common region to thereby specify a difference region between the plurality of the bird's-eye view images in the common region, and detects the difference region as the solid object reflecting region.

9. A visual field support device comprising:
the image processor according to claim 7; and
at least one of the n-number of photographing apparatuses and the display device.

10. A visual support method for respectively converting images photographed by an n-number of photographing apparatuses (where n is an integer of 2 or larger) into bird's-eye view images as viewed from a virtual visual point and displaying on a display device a synthetic bird's-eye view image obtained by synthesizing the obtained bird's-eye view images,
wherein the visual support method, when a solid object having some height is present in a common visual field photographed in common by a plurality of the photographing apparatuses,
detects a solid object reflecting region corresponding to a synthetic region of regions where the solid object is drawn in a plurality of the bird's-eye view images obtained from the plurality of the photographing apparatuses,
adopts, as an image of the solid object reflecting region in the synthetic bird's-eye view image, an image of the solid object reflecting region in one of the plurality of the bird's-eye view images, and
compares, between the plurality of the bird's-eye view images, images of a common region where the plurality of the bird's-eye view images overlap upon the synthesis to thereby detect the solid object reflecting region.

* * * * *